US008792735B2

(12) United States Patent
Matsuoka

(10) Patent No.: US 8,792,735 B2
(45) Date of Patent: Jul. 29, 2014

(54) IMAGE COMPRESSING APPARATUS WHICH EXTRACTS BLACK TEXT EDGE PIXELS FROM AN IMAGE AND COMPRESSES A LAYER WITH BLACK TEXT EDGE PIXELS EXTRACTED

(75) Inventor: Teruhiko Matsuoka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 257 days.

(21) Appl. No.: 13/086,466

(22) Filed: Apr. 14, 2011

(65) Prior Publication Data

US 2011/0255777 A1 Oct. 20, 2011

(30) Foreign Application Priority Data

Apr. 15, 2010 (JP) ................................. 2010-094392

(51) Int. Cl.
*G06K 9/36* (2006.01)

(52) U.S. Cl.
USPC ........................................................ 382/232

(58) Field of Classification Search
None
See application file for complete search history.

(56) References Cited

U.S. PATENT DOCUMENTS

| | | | | |
|---|---|---|---|---|
| 6,118,558 | A * | 9/2000 | Ohashi et al. .................. | 358/518 |
| 6,441,913 | B1 * | 8/2002 | Anabuki et al. ............... | 358/1.12 |
| 6,748,115 | B1 * | 6/2004 | Gross ............................. | 382/237 |
| 6,862,601 | B2 * | 3/2005 | Doney et al. .......................... | 1/1 |
| 7,133,565 | B2 | 11/2006 | Toda et al. | |
| 2003/0140055 | A1 * | 7/2003 | Doney et al. ................... | 707/101 |
| 2006/0055962 | A1 * | 3/2006 | Saito ............................. | 358/1.15 |
| 2006/0056710 | A1 * | 3/2006 | Bai et al. ........................ | 382/232 |
| 2006/0176501 | A1 * | 8/2006 | Yoshiura et al. .............. | 358/1.15 |
| 2006/0253536 | A1 * | 11/2006 | Fujiwara et al. ............... | 709/206 |
| 2007/0189615 | A1 * | 8/2007 | Liu et al. ........................ | 382/232 |
| 2007/0206228 | A1 * | 9/2007 | Miyagi .......................... | 358/3.21 |
| 2007/0217701 | A1 * | 9/2007 | Liu et al. ........................ | 382/234 |
| 2007/0230810 | A1 * | 10/2007 | Kanatsu ......................... | 382/243 |
| 2008/0239354 | A1 * | 10/2008 | Usui ................................ | 358/1.9 |
| 2008/0273807 | A1 * | 11/2008 | Dauw et al. .................... | 382/237 |
| 2008/0310685 | A1 * | 12/2008 | Speigle .......................... | 382/112 |
| 2009/0028436 | A1 * | 1/2009 | Yoshino et al. ................ | 382/190 |
| 2009/0213429 | A1 * | 8/2009 | Miyagi .......................... | 358/2.1 |
| 2009/0324068 | A1 * | 12/2009 | Yamakawa .................... | 382/165 |

FOREIGN PATENT DOCUMENTS

| | | | |
|---|---|---|---|
| JP | 2003-18413 | A | 1/2003 |
| JP | 2003-283821 | A | 10/2003 |
| JP | 2006-157371 | A | 6/2006 |
| JP | 2009-60474 | A | 3/2009 |

OTHER PUBLICATIONS

Wikipedia on JPEG, published in Mar. 2010.*

* cited by examiner

*Primary Examiner* — Bhavesh Mehta
*Assistant Examiner* — Feng Niu
(74) *Attorney, Agent, or Firm* — Birch, Stewart, Kolasch & Birch, LLP

(57) ABSTRACT

A color image processing apparatus is provided with a black text emphasis mode, in which, when compressing an image in a compression processing section, edges of a black text in the image are detected, a foreground layer in which the detected edges of the black text are represented by a binary image is generated, and lossless compression is performed on the foreground layer. When the black text emphasis mode is selected, a background layer in which the difference in density between the edges of the black text and pixels in the vicinity of the edges in the image is reduced is generated, and lossy compression is performed on the background layer. With this operation, in an image obtained by decompressing a compressed file, outline of the black text is clearly represented, and an artifact caused by the lossy compression is suppressed.

15 Claims, 32 Drawing Sheets

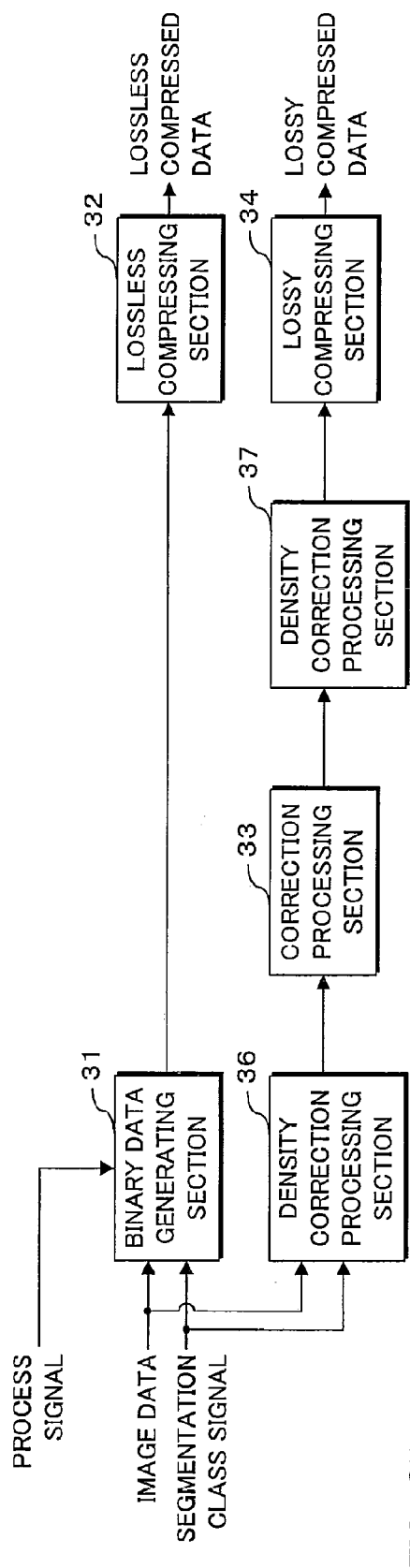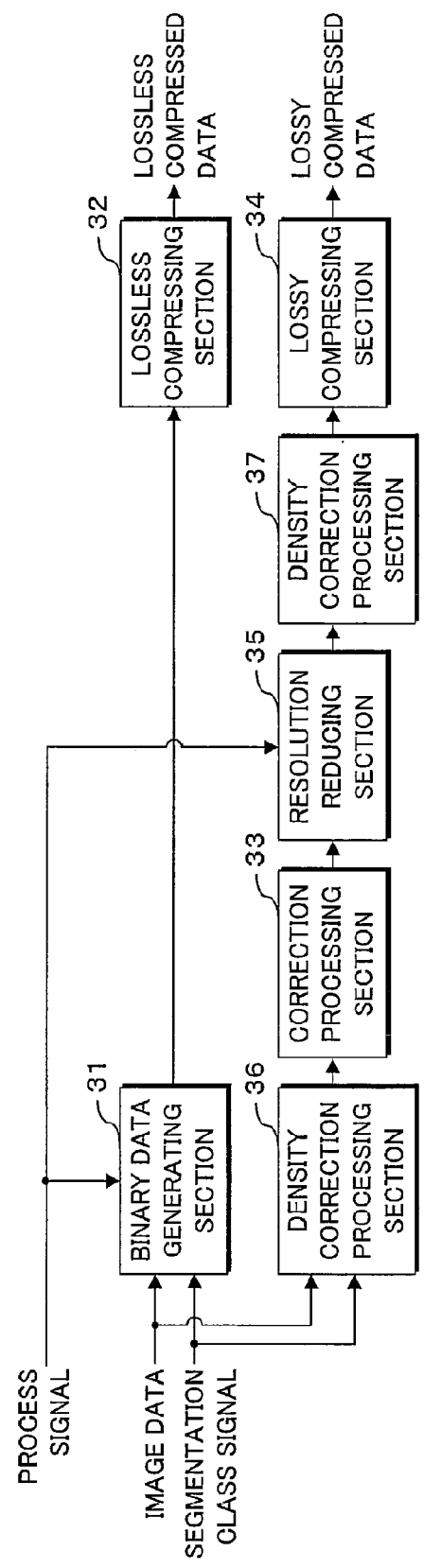

COLOR TEXT  BLACK TEXT  HALFTONE DOT  PHOTOGRAPH

| 0000 | 1010 | 0010 | 0110 | 0001 |
|------|------|------|------|------|
| 0000 | 1010 | 0010 | 0110 | 0001 |
| 1000 | 0010 | 0010 | 0110 | 0001 |
| 1000 | 0010 | 0110 | 0010 | 0001 |
| 0000 | 0010 | 0010 | 0010 | 0000 |

| 0 | 0 | 0 | 1 | 0 |
|---|---|---|---|---|
| 0 | 0 | 0 | 1 | 0 |
| 0 | 0 | 0 | 1 | 0 |
| 0 | 0 | 1 | 0 | 0 |
| 0 | 0 | 0 | 0 | 0 |

| 0 | 1 | 0 | 0 | 0 |
|---|---|---|---|---|
| 0 | 1 | 0 | 0 | 0 |
| 1 | 0 | 0 | 0 | 0 |
| 1 | 0 | 0 | 0 | 0 |
| 0 | 0 | 0 | 0 | 0 |

FIG. 6A

| 255 | 255 | 255 | 255 | 255 | 255 | 60 | 10 | 60 | 255 | 255 |
|-----|-----|-----|-----|-----|-----|-----|-----|-----|-----|-----|
| 255 | 255 | 255 | 255 | 255 | 255 | 60 | 10 | 60 | 255 | 255 |
| 255 | 255 | 255 | 255 | 255 | 255 | 40 | 10 | 60 | 255 | 255 |
| 255 | 255 | 255 | 255 | 255 | 60 | 10 | 40 | 255 | 255 | 255 |
| 255 | 255 | 255 | 255 | 255 | 60 | 10 | 60 | 255 | 255 | 255 |
| 255 | 255 | 255 | 255 | 255 | 60 | 10 | 60 | 255 | 255 | 255 |
| 255 | 255 | 255 | 255 | 255 | 40 | 10 | 60 | 255 | 255 | 255 |
| 255 | 255 | 255 | 255 | 60 | 10 | 40 | 255 | 255 | 255 | 255 |
| 255 | 255 | 255 | 255 | 60 | 10 | 60 | 255 | 255 | 255 | 255 |
| 255 | 255 | 255 | 255 | 60 | 10 | 60 | 255 | 255 | 255 | 255 |
| 255 | 255 | 255 | 255 | 60 | 10 | 60 | 255 | 255 | 255 | 255 |
| 255 | 255 | 255 | 255 | 40 | 10 | 60 | 255 | 255 | 255 | 255 |
| 255 | 255 | 255 | 60 | 10 | 40 | 255 | 255 | 255 | 255 | 255 |
| 255 | 255 | 255 | 60 | 10 | 60 | 255 | 255 | 255 | 255 | 255 |
| 255 | 255 | 255 | 60 | 10 | 60 | 255 | 255 | 255 | 255 | 255 |
| 255 | 255 | 255 | 40 | 10 | 60 | 255 | 255 | 255 | 255 | 255 |
| 255 | 255 | 60 | 10 | 40 | 255 | 255 | 255 | 255 | 255 | 255 |
| 255 | 255 | 40 | 10 | 60 | 255 | 255 | 255 | 255 | 255 | 255 |
| 255 | 60 | 10 | 40 | 255 | 255 | 255 | 255 | 255 | 255 | 255 |
| 255 | 60 | 10 | 60 | 255 | 255 | 255 | 255 | 255 | 255 | 255 |

FIG. 6B

| -1 |   | 1 |
|----|---|---|
| -1 |   | 1 |
| -1 |   | 1 |

FIG. 6C

| -1 | -1 | -1 |
|----|----|----|
|    |    |    |
| 1  | 1  | 1  |

FIG. 7A

| | | | | | | | | |
|---|---|---|---|---|---|---|---|---|
| | 0 | 0 | 0 | 0 | 625 | 755 | 0 | 735 | 585 |
| | 0 | 0 | 0 | 390 | 900 | 725 | 440 | 930 | 585 |
| | 0 | 0 | 0 | 585 | 930 | 440 | 725 | 900 | 390 |
| | 0 | 0 | 0 | 585 | 735 | 0 | 755 | 625 | 0 |
| | 0 | 0 | 0 | 625 | 755 | 0 | 735 | 585 | 0 |
| | 0 | 0 | 390 | 900 | 725 | 440 | 930 | 585 | 0 |
| | 0 | 0 | 585 | 930 | 440 | 725 | 900 | 390 | 0 |
| | 0 | 0 | 585 | 735 | 0 | 755 | 625 | 0 | 0 |
| | 0 | 0 | 585 | 735 | 0 | 735 | 585 | 0 | 0 |
| | 0 | 0 | 625 | 755 | 0 | 735 | 585 | 0 | 0 |
| | 0 | 390 | 900 | 725 | 440 | 930 | 585 | 0 | 0 |
| | 0 | 585 | 930 | 440 | 725 | 900 | 390 | 0 | 0 |
| | 0 | 585 | 735 | 0 | 755 | 625 | 0 | 0 | 0 |
| | 0 | 625 | 755 | 0 | 735 | 585 | 0 | 0 | 0 |
| | 390 | 900 | 725 | 440 | 930 | 585 | 0 | 0 | 0 |
| | 625 | 950 | 440 | 725 | 900 | 390 | 0 | 0 | 0 |
| | 900 | 725 | 440 | 950 | 625 | 0 | 0 | 0 | 0 |
| | 930 | 440 | 725 | 900 | 390 | 0 | 0 | 0 | 0 |

FIG. 7B

| | | | | | | | | |
|---|---|---|---|---|---|---|---|---|
| | 0 | 0 | 0 | 0 | 1 | 1 | 0 | 1 | 1 |
| | 0 | 0 | 0 | 0 | 1 | 1 | 0 | 1 | 1 |
| | 0 | 0 | 0 | 1 | 1 | 0 | 1 | 1 | 0 |
| | 0 | 0 | 0 | 1 | 1 | 0 | 1 | 1 | 0 |
| | 0 | 0 | 0 | 1 | 1 | 0 | 1 | 1 | 0 |
| | 0 | 0 | 0 | 1 | 1 | 0 | 1 | 1 | 0 |
| | 0 | 0 | 1 | 1 | 0 | 1 | 1 | 0 | 0 |
| | 0 | 0 | 1 | 1 | 0 | 1 | 1 | 0 | 0 |
| | 0 | 0 | 1 | 1 | 0 | 1 | 1 | 0 | 0 |
| | 0 | 0 | 1 | 1 | 0 | 1 | 1 | 0 | 0 |
| | 0 | 0 | 1 | 1 | 0 | 1 | 1 | 0 | 0 |
| | 0 | 1 | 1 | 0 | 1 | 1 | 0 | 0 | 0 |
| | 0 | 1 | 1 | 0 | 1 | 1 | 0 | 0 | 0 |
| | 0 | 1 | 1 | 0 | 1 | 1 | 0 | 0 | 0 |
| | 0 | 1 | 1 | 0 | 1 | 1 | 0 | 0 | 0 |
| | 1 | 1 | 0 | 1 | 1 | 0 | 0 | 0 | 0 |
| | 1 | 1 | 0 | 1 | 1 | 0 | 0 | 0 | 0 |
| | 1 | 0 | 1 | 1 | 0 | 0 | 0 | 0 | 0 |

FIG. 8

| | | | | | | | | |
|---|---|---|---|---|---|---|---|---|
| 0 | 0 | 0 | 0 | 0 | 1 | 0 | 1 | 0 |
| 0 | 0 | 0 | 0 | 0 | 1 | 0 | 1 | 0 |
| 0 | 0 | 0 | 0 | 1 | 0 | 1 | 0 | 0 |
| 0 | 0 | 0 | 0 | 1 | 0 | 1 | 0 | 0 |
| 0 | 0 | 0 | 0 | 1 | 0 | 1 | 0 | 0 |
| 0 | 0 | 0 | 0 | 1 | 0 | 1 | 0 | 0 |
| 0 | 0 | 0 | 1 | 0 | 1 | 0 | 0 | 0 |
| 0 | 0 | 0 | 1 | 0 | 1 | 0 | 0 | 0 |
| 0 | 0 | 0 | 1 | 0 | 1 | 0 | 0 | 0 |
| 0 | 0 | 0 | 1 | 0 | 1 | 0 | 0 | 0 |
| 0 | 0 | 0 | 1 | 0 | 1 | 0 | 0 | 0 |
| 0 | 0 | 1 | 0 | 1 | 0 | 0 | 0 | 0 |
| 0 | 0 | 1 | 0 | 1 | 0 | 0 | 0 | 0 |
| 0 | 0 | 1 | 0 | 1 | 0 | 0 | 0 | 0 |
| 0 | 0 | 1 | 0 | 1 | 0 | 0 | 0 | 0 |
| 0 | 1 | 0 | 1 | 0 | 0 | 0 | 0 | 0 |
| 0 | 1 | 0 | 1 | 0 | 0 | 0 | 0 | 0 |
| 1 | 0 | 1 | 0 | 0 | 0 | 0 | 0 | 0 |

FIG. 13

| 3 | 2 | 2 | 2 | 2 | 2 | 3 |
|---|---|---|---|---|---|---|
| 1 | 2 | 2 | 2 | 2 | 2 | 1 |
| 1 | 1 | 0 | 0 | 0 | 1 | 1 |
| 1 | 1 | 0 | 0 | 0 | 1 | 1 |
| 1 | 1 | 0 | 0 | 0 | 1 | 1 |
| 1 | 2 | 2 | 2 | 2 | 2 | 1 |
| 3 | 2 | 2 | 2 | 2 | 2 | 3 |

FIG. 14

| 0 | 0 | 0 | 0 | 0 | 0 | 0 |
|---|---|---|---|---|---|---|
| 0 | 0 | 0 | 0 | 0 | 0 | 0 |
| 0 | 0 | 1 | 1 | 1 | 0 | 0 |
| 0 | 0 | 1 | 8 | 1 | 0 | 0 |
| 0 | 0 | 1 | 1 | 1 | 0 | 0 |
| 0 | 0 | 0 | 0 | 0 | 0 | 0 |
| 0 | 0 | 0 | 0 | 0 | 0 | 0 |

FIG. 15A

| 243 | 243 | 243 | 242 | 242 | 242 | 242 | 244 | 243 | 243 | 243 | 243 |
|-----|-----|-----|-----|-----|-----|-----|-----|-----|-----|-----|-----|
| 243 | 243 | 243 | 242 | 242 | 242 | 242 | 244 | 243 | 243 | 243 | 243 |
| 243 | 243 | 243 | 242 | 242 | 242 | 242 | 244 | 243 | 243 | 243 | 243 |
| 243 | 243 | 243 | 242 | 242 | 242 | 242 | 244 | 243 | 243 | 243 | 243 |
| 243 | 243 | 243 | 242 | 242 | 242 | 242 | 244 | 243 | 243 | 243 | 243 |
| 243 | 243 | 243 | 150 | 150 | 150 | 150 | 150 | 150 | 243 | 243 | 243 |
| 243 | 243 | 150 | 102 | 102 | 102 | 102 | 102 | 101 | 150 | 243 | 243 |
| 241 | 150 | 101 | 60  | 60  | 57  | 59  | 57  | 54  | 102 | 150 | 241 |
| 242 | 150 | 101 | 60  | 60  | 57  | 59  | 57  | 54  | 102 | 102 | 150 |
| 242 | 150 | 101 | 60  | 60  | 57  | 59  | 57  | 51  | 62  | 101 | 102 |
| 244 | 150 | 104 | 58  | 58  | 54  | 55  | 57  | 61  | 64  | 64  | 104 |
| 244 | 150 | 102 | 62  | 62  | 61  | 52  | 53  | 61  | 64  | 63  | 64  |
| 243 | 243 | 150 | 102 | 102 | 102 | 102 | 102 | 103 | 101 | 63  | 63  |
| 243 | 243 | 243 | 150 | 150 | 150 | 150 | 150 | 150 | 103 | 104 | 63  |
| 243 | 243 | 243 | 242 | 242 | 242 | 242 | 244 | 243 | 150 | 103 | 102 |
| 243 | 243 | 243 | 242 | 242 | 242 | 242 | 244 | 243 | 243 | 150 | 102 |
| 243 | 243 | 243 | 242 | 242 | 242 | 242 | 244 | 243 | 243 | 243 | 150 |
| 243 | 243 | 243 | 242 | 242 | 242 | 242 | 244 | 243 | 243 | 243 | 243 |
| 243 | 243 | 243 | 242 | 242 | 242 | 242 | 244 | 243 | 243 | 243 | 243 |
| 243 | 243 | 243 | 242 | 242 | 242 | 242 | 244 | 243 | 243 | 243 | 243 |

FIG. 15B

| 0 | 0 | 0 | 0 | 0 | 0 | 0 | 0 | 0 | 0 | 0 | 0 |
|---|---|---|---|---|---|---|---|---|---|---|---|
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 1 | 1 | 1 | 1 | 1 | 1 | 0 | 0 | 0 |
| 0 | 0 | 1 | 0 | 0 | 0 | 0 | 0 | 0 | 1 | 0 | 0 |
| 0 | 0 | 1 | 0 | 0 | 0 | 0 | 0 | 0 | 1 | 1 | 0 |
| 0 | 0 | 1 | 0 | 0 | 0 | 0 | 0 | 0 | 0 | 1 | 1 |
| 0 | 0 | 1 | 0 | 0 | 0 | 0 | 0 | 0 | 0 | 0 | 0 |
| 0 | 0 | 1 | 0 | 0 | 0 | 0 | 0 | 0 | 0 | 0 | 0 |
| 0 | 0 | 0 | 1 | 1 | 1 | 1 | 1 | 1 | 0 | 0 | 0 |
| 0 | 0 | 0 | 0 | 0 | 0 | 0 | 0 | 0 | 1 | 1 | 0 |
| 0 | 0 | 0 | 0 | 0 | 0 | 0 | 0 | 0 | 0 | 1 | 1 |
| 0 | 0 | 0 | 0 | 0 | 0 | 0 | 0 | 0 | 0 | 0 | 1 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |

FIG. 16

| 243 | 243 | 243 | 242 | 242 | 242 | 242 | 244 | 243 | 243 | 243 | 243 |
|---|---|---|---|---|---|---|---|---|---|---|---|
| 243 | 243 | 242 | 242 | 242 | 242 | 242 | 243 | 243 | 243 | 243 | 243 |
| 243 | 243 | 242 | 242 | 242 | 242 | 242 | 243 | 243 | 243 | 243 | 243 |
| 243 | 243 | 242 | 242 | 242 | 242 | 242 | 243 | 243 | 243 | 243 | 243 |
| 243 | 243 | 237 | 230 | 224 | 224 | 225 | 226 | 231 | 237 | 243 | 243 |
| 243 | 237 | 222 | 167 | 158 | 158 | 158 | 158 | 167 | 222 | 237 | 243 |
| 243 | 222 | 155 | 171 | 157 | 146 | 145 | 153 | 159 | 155 | 222 | 243 |
| 241 | 166 | 135 | 76 | 67 | 66 | 66 | 65 | 72 | 119 | 158 | 241 |
| 242 | 158 | 118 | 67 | 59 | 57 | 58 | 56 | 60 | 97 | 79 | 150 |
| 242 | 158 | 112 | 67 | 59 | 57 | 57 | 56 | 57 | 68 | 70 | 102 |
| 244 | 158 | 118 | 67 | 58 | 56 | 55 | 56 | 59 | 64 | 71 | 104 |
| 244 | 167 | 135 | 77 | 68 | 67 | 62 | 63 | 68 | 68 | 68 | 64 |
| 243 | 222 | 155 | 171 | 157 | 146 | 140 | 133 | 125 | 104 | 70 | 63 |
| 243 | 237 | 222 | 167 | 158 | 158 | 158 | 158 | 149 | 116 | 95 | 63 |
| 243 | 243 | 237 | 230 | 224 | 224 | 225 | 226 | 216 | 158 | 108 | 102 |
| 243 | 243 | 242 | 242 | 242 | 242 | 242 | 243 | 237 | 222 | 158 | 102 |
| 243 | 243 | 242 | 242 | 242 | 242 | 242 | 243 | 243 | 237 | 222 | 150 |
| 243 | 243 | 242 | 242 | 242 | 242 | 242 | 243 | 243 | 243 | 237 | 243 |
| 243 | 243 | 242 | 242 | 242 | 242 | 242 | 243 | 243 | 243 | 243 | 243 |
| 243 | 243 | 243 | 242 | 242 | 242 | 242 | 244 | 243 | 243 | 243 | 243 |

FIG. 17

| 243 | 242 | 242 | 243 | 243 | 243 |
|-----|-----|-----|-----|-----|-----|
| 243 | 242 | 242 | 243 | 243 | 243 |
| 242 | 214 | 191 | 192 | 214 | 242 |
| 218 | 134 | 109 | 107 | 126 | 216 |
| 200 | 91  | 58  | 57  | 71  | 100 |
| 203 | 99  | 62  | 59  | 65  | 77  |
| 236 | 179 | 155 | 147 | 124 | 73  |
| 243 | 238 | 233 | 234 | 208 | 118 |
| 243 | 242 | 242 | 243 | 242 | 213 |
| 243 | 242 | 242 | 243 | 243 | 243 |

FIG. 19A

| 243 | 243 | 243 | 242 | 242 | 242 | 242 | 244 | 243 | 243 | 243 | 243 |
|---|---|---|---|---|---|---|---|---|---|---|---|
| 243 | 243 | 243 | 242 | 242 | 242 | 242 | 244 | 243 | 243 | 243 | 243 |
| 243 | 243 | 243 | 242 | 242 | 242 | 242 | 244 | 243 | 243 | 243 | 243 |
| 243 | 243 | 243 | 242 | 242 | 242 | 242 | 244 | 243 | 243 | 243 | 243 |
| 243 | 243 | 243 | 242 | 242 | 242 | 242 | 244 | 243 | 243 | 243 | 243 |
| 243 | 243 | 243 | 150 | 150 | 150 | 150 | 150 | 150 | 243 | 243 | 243 |
| 243 | 243 | 150 | 102 | 102 | 102 | 102 | 102 | 101 | 150 | 243 | 243 |
| 241 | 150 | 101 | 30 | 30 | 27 | 29 | 27 | 24 | 102 | 150 | 241 |
| 242 | 150 | 101 | 30 | 30 | 27 | 29 | 27 | 24 | 102 | 102 | 150 |
| 242 | 150 | 101 | 30 | 30 | 27 | 29 | 27 | 21 | 32 | 101 | 102 |
| 244 | 150 | 104 | 28 | 28 | 24 | 25 | 27 | 31 | 34 | 34 | 104 |
| 244 | 150 | 102 | 32 | 32 | 31 | 22 | 23 | 31 | 34 | 33 | 34 |
| 243 | 243 | 150 | 102 | 102 | 102 | 102 | 102 | 103 | 101 | 33 | 33 |
| 243 | 243 | 243 | 150 | 150 | 150 | 150 | 150 | 150 | 103 | 104 | 33 |
| 243 | 243 | 243 | 242 | 150 | 242 | 242 | 244 | 243 | 150 | 103 | 102 |
| 243 | 243 | 243 | 242 | 242 | 242 | 242 | 244 | 243 | 243 | 150 | 102 |
| 243 | 243 | 243 | 242 | 242 | 242 | 242 | 244 | 243 | 243 | 243 | 150 |
| 243 | 243 | 243 | 242 | 242 | 242 | 242 | 244 | 243 | 243 | 243 | 243 |
| 243 | 243 | 243 | 242 | 242 | 242 | 242 | 244 | 243 | 243 | 243 | 243 |
| 243 | 243 | 243 | 242 | 242 | 242 | 242 | 244 | 243 | 243 | 243 | 243 |

FIG. 19B

| 243 | 243 | 243 | 242 | 242 | 242 | 242 | 244 | 243 | 243 | 243 | 243 |
|---|---|---|---|---|---|---|---|---|---|---|---|
| 243 | 243 | 242 | 242 | 242 | 242 | 242 | 243 | 243 | 243 | 243 | 243 |
| 243 | 243 | 242 | 242 | 242 | 242 | 242 | 243 | 243 | 243 | 243 | 243 |
| 243 | 243 | 242 | 242 | 242 | 242 | 242 | 243 | 243 | 243 | 243 | 243 |
| 243 | 243 | 237 | 230 | 224 | 224 | 225 | 226 | 231 | 237 | 243 | 243 |
| 243 | 237 | 222 | 167 | 158 | 158 | 158 | 158 | 167 | 222 | 237 | 243 |
| 243 | 222 | 153 | 163 | 147 | 135 | 132 | 142 | 151 | 153 | 222 | 243 |
| 241 | 166 | 128 | 55 | 43 | 41 | 42 | 40 | 51 | 109 | 158 | 241 |
| 242 | 158 | 110 | 43 | 29 | 27 | 28 | 26 | 34 | 85 | 69 | 150 |
| 242 | 158 | 105 | 43 | 29 | 27 | 27 | 26 | 29 | 44 | 60 | 102 |
| 244 | 158 | 110 | 42 | 28 | 26 | 25 | 26 | 29 | 36 | 46 | 104 |
| 244 | 167 | 125 | 56 | 44 | 42 | 38 | 39 | 43 | 42 | 41 | 34 |
| 243 | 222 | 154 | 161 | 144 | 132 | 123 | 118 | 112 | 94 | 46 | 33 |
| 243 | 237 | 222 | 161 | 152 | 152 | 158 | 158 | 149 | 105 | 87 | 33 |
| 243 | 243 | 237 | 224 | 178 | 219 | 225 | 226 | 216 | 158 | 101 | 102 |
| 243 | 243 | 242 | 236 | 236 | 236 | 242 | 243 | 237 | 222 | 158 | 102 |
| 243 | 243 | 242 | 242 | 242 | 242 | 242 | 243 | 243 | 237 | 222 | 150 |
| 243 | 243 | 242 | 242 | 242 | 242 | 242 | 243 | 243 | 243 | 237 | 243 |
| 243 | 243 | 242 | 242 | 242 | 242 | 242 | 243 | 243 | 243 | 243 | 243 |
| 243 | 243 | 243 | 242 | 242 | 242 | 242 | 244 | 243 | 243 | 243 | 243 |

FIG. 20A

| 243 | 242 | 242 | 243 | 243 | 243 |
|-----|-----|-----|-----|-----|-----|
| 243 | 242 | 242 | 243 | 243 | 243 |
| 242 | 214 | 191 | 192 | 214 | 242 |
| 218 | 125 | 92  | 89  | 116 | 216 |
| 200 | 75  | 28  | 27  | 48  | 95  |
| 203 | 83  | 35  | 32  | 38  | 56  |
| 236 | 175 | 145 | 139 | 115 | 50  |
| 243 | 235 | 217 | 234 | 208 | 116 |
| 243 | 242 | 242 | 243 | 242 | 213 |
| 243 | 242 | 242 | 243 | 243 | 243 |

FIG. 20B

| 243 | 242 | 242 | 243 | 243 | 243 |
|-----|-----|-----|-----|-----|-----|
| 243 | 242 | 242 | 243 | 243 | 243 |
| 242 | 214 | 191 | 192 | 214 | 242 |
| 218 | 123 | 83  | 80  | 112 | 216 |
| 200 | 63  | 8   | 6   | 31  | 87  |
| 203 | 73  | 16  | 12  | 19  | 41  |
| 236 | 175 | 145 | 139 | 111 | 34  |
| 243 | 235 | 217 | 234 | 208 | 112 |
| 243 | 242 | 242 | 243 | 242 | 213 |
| 243 | 242 | 242 | 243 | 243 | 243 |

IMAGE COMPRESSING APPARATUS WHICH EXTRACTS BLACK TEXT EDGE PIXELS FROM AN IMAGE AND COMPRESSES A LAYER WITH BLACK TEXT EDGE PIXELS EXTRACTED

CROSS-REFERENCE TO RELATED APPLICATIONS

This Nonprovisional application claims priority under 35 U.S.C. §119(a) on Patent Application No. 2010-94392 filed in Japan on Apr. 15, 2010, the entire contents of which are hereby incorporated by reference.

BACKGROUND

1. Technical Field

The present invention relates to an image compressing apparatus for compressing a color image, an image outputting apparatus including the image compressing apparatus, and an image compressing method.

2. Description of Related Art

In recent years, digital image processing systems have been remarkably developed, and establishment of digital image processing techniques have been advanced. For example, an image processing technique that reads an image such as a document recorded on a sheet of paper or the like using a scanner to generate a document file (image data) as electronic data is widely used in the fields of an electrophotographic or inkjet copier, an MFP (Multi-Function Printer), and the like. The document file generated by the image processing technique is used for various purposes by being stored in a database, or transmitted and received using facsimile communication or e-mail.

In general, image data read by a scanner (hereinafter referred to as a scanned image) has a large file size, and hence it is essential to compress the scanned image in order to efficiently store or transmit the scanned image.

As one compression technique for compressing an image at a high compression ratio, a compression technique on the basis of layer separation such as Mixed Raster Content (MRC) has been put into practical use. In the compression technique on the basis of layer separation, a foreground mask representing a text and/or a line art is generated from an image to be compressed, the image is separated into a foreground layer and a background layer on the basis of the generated foreground mask, and the foreground layer and the background layer are compressed by employing respective suitable compressing methods, whereby a highly compressed image is finally generated. At this point, the foreground layer is a layer of a foreground representing a text and/or a line art, and is generally compressed by employing a lossless compression technique such as JBIG (Joint Bi-level Image Experts Group), MMR (Modified Modified Readcode), LZW (Lempel Ziv Welch), or the like.

On the other hand, the background layer is a layer of a background representing an image content other than the text and/or the line art, and is generally compressed by employing a lossy compression technique such as JPEG (Joint Photographic Experts Group) or the like.

In a technique described in Japanese Patent Application Laid-Open No. 2003-18413, a color used in a text region is extracted from each text region in a color document image, an inclusive image including the text region in which the color is used is generated, MMR compression is performed on the inclusive image, and palette information and inclusive image information are added as a header. In addition, when a target text region has only one color, the MMR compression is performed on the target text region and, when the target text region has a plurality of colors, lossless compression is performed thereon. In the compression result, palette information and text information are added to a header. Further, in Japanese Patent Application Laid-Open No. 2003-18413, there is proposed a method in which the text region in the color document image is identified using the text information, an image having the identified text region filled with a specific color (corresponding to a page background image or a background layer) is generated, and JPEG compression is performed on the generated image.

In the compression by the lossy compression technique, the image quality of an image after being compressed is likely to be degraded when compared with the compression by the lossless compression technique. However, since the compression ratio is easily controlled in the lossy compression technique, in accordance with the use of a compressed image, the compression ratio can be increased with priority given to a small file size, or the compression ratio can be reduced with priority given to high image quality. On the other hand, since the compression ratio is difficult to control in the lossless compression technique, it is difficult to improve the compression ratio.

SUMMARY

When a text and a background in an image are separated, an entire text shape is generally extracted. Extraction of the entire text shape can be realized by detecting the space between the rising and falling of an edge as the text, or identifying a density or a color of the text to detect the text using a threshold value process. However, in order to extract the text shape with high precision, it is necessary to perform various pre-processes and post-processes for excluding elements other than the text such as a photograph edge, a printing halftone dot, and a noise, and it is therefore difficult to precisely extract the text shape.

In addition, in the technique described in Japanese Patent Application Laid-Open No. 2003-18413, there is no problem when the text region is correctly extracted. However, when the text region is not extracted correctly, the text region is determined as the background layer, and is subjected to the lossy compression. In this case, there arises a problem that the text is deformed by the lossy compression and the visibility of the text is thereby reduced.

The present invention has been devised in consideration of the aforementioned circumstances, and an object thereof is to provide an image compressing apparatus, an image outputting apparatus, and an image compressing method each in which a user is capable of appropriately selecting a condition to be prioritized from among conditions such as the improvement in the visibility of a black text included in an image after being compressed, the improvement in the visibility of a color text included therein, and the file size of a compressed file.

The image compressing apparatus according to the present invention is an image compressing apparatus for compressing an image including a plurality of pixels to generate a compressed file, including a compression ratio receiving section that receives selection of a compression ratio during a time of generation of the compressed file, and a black text selection receiving section that receives selection of whether or not a pixel constituting an edge of a black text is extracted from the image during the time of generation of the compressed file when the compression ratio receiving section receives a high compression ratio.

According to the present invention, in the image compressing apparatus capable of a compression process at a high compression ratio, it becomes possible to select the compression ratio during the time of generation of the compressed file, and select whether or not the pixel constituting the edge of the black text is extracted from the image during the time of generation of the compressed file. For example, when the execution of the compression process at a high compression ratio is instructed and the extraction of pixels constituting the edge of the black text is instructed, the pixels constituting the edge of the black text are extracted from the image to generate a foreground layer, pixels included in the foreground layer are replaced with values of surrounding pixels to generate a background layer, and the layers are compressed to generate the compressed file. With this operation, since the black text can be reliably separated from the background layer, the outline of the black text is clarified, and the compressed file in which the visibility of the black text is improved can be generated. In addition, when the background layer is compressed after the resolution thereof is reduced, the compressed file having a smaller file size can be generated.

The image compressing apparatus according to the present invention further includes a process selection receiving section that receives selection of whether or not a process for improving reproducibility of a color text in the image is performed when the black text selection receiving section receives the selection indicating that the pixel constituting the edge of the black text is extracted.

According to the present invention, when the pixel constituting the edge of the black text is extracted from the image to generate the compressed file, it becomes possible to select whether or not the process for improving the reproducibility of the color text in the image is performed. For example, when the instruction for not performing the process for improving the reproducibility of the color text is given, the resolution of the generated background layer is reduced before being compressed, and the data size is thereby reduced. Therefore, the compressed file having a smaller file size can be generated. In addition, when the instruction for performing the process for improving the reproducibility of the color text is given, since the generated background layer is compressed without the reduction of the resolution thereof, the visibility of the color text included in the background layer can be improved, though the data size thereof is large.

The image compressing apparatus according to the present invention further includes a file format receiving section that receives selection of a file format of the compressed file.

According to the present invention, since the file format of the compressed file to be generated can be selected, it becomes possible to provide the compressed file of the file format in accordance with preferences of a user.

In the image compressing apparatus according to the present invention, the file format includes PDF (Portable Document Format) or XPS (XML Paper Specification).

According to the present invention, PDF or XPS can be selected as the file format of the compressed file to be generated. For example, in an apparatus having a function for generating a highly compressed PDF file obtained by separating an image into a text portion and a portion other than the text, and compressing each of the portions using an appropriate method, it is possible to generate the compressed file having a file size equal to that of the highly compressed PDF file in which the visibility of the black text is maintained without adding a new circuit configuration to the apparatus.

The image compressing apparatus according to the present invention further includes a color text selection receiving section that receives selection of whether or not a pixel constituting an edge of a color text of one color other than the black text is extracted from the image during the time of generation of the compressed file.

According to the present invention, it becomes possible to select whether or not the pixel constituting the edge of the color text of another color in addition to the black text is extracted from the image during the time of generation of the compressed file. For example, when the execution of the compression process at a high compression ratio is instructed and the extraction of pixels constituting the edges of the black text and the color text of the specified color is instructed, the pixels constituting the edges of the black text and the color text are extracted from the image to generate the foreground layers, pixels included in the foreground layers are replaced with values of surrounding pixels to generate the background layer, and the layers are compressed to generate the compressed file. With this operation, since the black text and the color text can be reliably separated from the background layer, the outlines of the black text and the color text are clarified, and the compressed file in which the visibility of not only the black text but also the color text of the specific color is improved can be generated.

The image compressing apparatus according to the present invention further includes an extracting section that extracts the pixel constituting the edge of the black text from the image when the black text selection receiving section receives the selection indicating that the pixel constituting the edge of the black text is extracted, and a compressing section that compresses an image made of the pixel extracted by the extracting section.

According to the present invention, when the extraction of the pixel constituting the edge of the black text is instructed, the pixels constituting the edge of the black text are extracted from the image to generate the foreground layer, and the generated foreground layer is compressed. When the foreground layer is subjected to, e.g., lossless compression, the reduction in the visibility of the black text can be prevented.

The image compressing apparatus according to the present invention is an image compressing apparatus for compressing an image including a plurality of pixels to generate a compressed file, including a compression ratio receiving section that receives selection of a compression ratio during a time of generation of the compressed file, a determining section that determines whether or not a predetermined number or more of pixels in correspondence to a black text are included in the image on a basis of a segmentation class signal indicative of which one of a plurality of segments including a text segment each pixel in the image belongs to when the compression ratio receiving section receives a high compression ratio, an extracting section that extracts a pixel constituting an edge of the black text from the image when the determining section determines that the predetermined number or more of pixels in correspondence to the black text are included, and a compressing section that compresses an image made of the pixel extracted by the extracting section.

According to the present invention, in the image compressing apparatus capable of the compression process at a high compression ratio, the type of the compression process during the time of generation of the compressed file can be appropriately switched in accordance with the image to be processed, and an appropriate compressed file can be generated. Specifically, when the predetermined number or more of pixels in correspondence to the black text are included in the image, pixels constituting the edge of the black text are extracted from the image to generate the foreground layer, pixels included in the foreground layer are replaced with values of surrounding pixels to generate the background layer, and the layers are compressed to generate the compressed file. With this operation, when the image having a large number of pixels in correspondence to the black text is highly compressed, the compressed file in which the visibility of the black text is improved can be generated.

The image compressing apparatus according to the present invention further includes a resolution reducing section that reduces a resolution of an image made of a pixel other than the pixel extracted from the image by the extracting section.

According to the present invention, by reducing the resolution of the image made of pixels other than the pixels extracted from the image by the extracting section (corresponding to the background layer), the size of the compressed file to be generated can be further reduced.

In the image compressing apparatus according to the present invention, the determining section determines whether or not a predetermined number or more of pixels in correspondence to a color text are included in the image on the basis of the segmentation class signal, and the image compressing apparatus according to the present invention further includes a control section that prevents the resolution reducing section from performing a resolution reduction process when the determining section determines that the predetermined number or more of pixels in correspondence to the color text are included.

According to the present invention, it is possible to appropriately switch whether or not to reduce the resolution of the background layer in accordance with the image to be processed. Specifically, when the specific number or more of pixels in correspondence to the color text are included in the image, the resolution of the background layer is not reduced. Therefore, when the image having both the black text and the color text is highly compressed, by not reducing the resolution of the background layer, the compressed file in which the visibility of not only the black text but also the color text included in the background layer is improved can be generated.

The image outputting apparatus according to the present invention includes one of the above-described image compressing apparatuses, and an output section that outputs a compressed file generated in the image compressing apparatus to an outside.

According to the present invention, the image outputting apparatus provided with the above-described image compressing apparatus can be realized.

The image compressing method according to the present invention is an image compressing method for compressing an image including a plurality of pixels to generate a compressed file, including steps of receiving selection of a compression ratio during a time of generation of the compressed file, and receiving selection of whether or not a pixel constituting an edge of a black text is extracted from the image during the time of generation of the compressed file when a high compression ratio is received.

The image compressing method according to the present invention is an image compressing method for compressing an image including a plurality of pixels to generate a compressed file, including steps of receiving selection of a compression ratio during a time of generation of the compressed file, determining whether or not a predetermined number or more of pixels in correspondence to a black text are included in the image on a basis of a segmentation class signal indicative of which one of a plurality of segments including a text segment each pixel in the image belongs to when a high compression ratio is received, extracting a pixel constituting an edge of the black text from the image when it is determined that the predetermined number or more of pixels in correspondence to the black text are included, and compressing an image made of the extracted pixel.

A recording medium according to the present invention records a computer program for causing a computer to execute the individual steps described above. According to the present invention, the above-described image compressing apparatus can be realized by the computer.

In the present invention, it becomes possible to perform the compression process under conditions desired by a user, and provide the compressed file desired by a user. For example, it becomes possible to select the compressed file having a small file size in which the readability (the visibility) of the black text is maintained, the compressed file having a small file size in which the visibility of the color text of one color specified by a user is maintained in addition to that of the black text, or the compressed file having a larger file size in which the visibility of the text is maintained. Since the outlines of the black text and the color text are clearly represented in the image obtained by decompressing the compressed file by the compression process that maintains the visibility of the black text and the color text, the deterioration in the readability of the text resulting from the deformation of the text is suppressed. In addition, since the visibility of the black text that is most frequently used in various documents, or the visibility of the color text of the color specified by a user is improved, the visibility of the text is high also in the image in which a document is compressed, and the document can be reused. Further, by the compression process that prioritizes the visibility of the text, the compressed file in which the visibility of not only the black text and the color text of the color specified by a user but also the text included in the background is improved can be generated, though the file size thereof is increased.

The above and further objects and features of the invention will more fully be apparent from the following detailed description with accompanying drawings.

BRIEF DESCRIPTION OF THE SEVERAL VIEWS OF THE DRAWINGS

FIGS. 3A and 3B are block diagrams each illustrating the internal structure of the compression processing section;

FIGS. 6A to 6C are conceptual views illustrating an example in which the edge of the black text is detected using a filter process and a process for judging a black pixel;

FIGS. 7A and 7B are conceptual views illustrating an example in which the edge of the black text is detected using the filter process and the process for judging the black pixel;

FIG. 8 is a conceptual view illustrating an example in which the edge of the black text is detected using the filter process and the process for judging the black pixel;

FIG. 13 is a view illustrating an example of a filter for calculating a weighted average;

FIG. 14 is a view illustrating an example of a smoothing filter;

FIGS. 15A and 15B are views illustrating an example of a result of the filter process by a correction processing section;

FIG. 16 is a view illustrating an example of the result of the filter process by the correction processing section;

FIG. 17 is a view illustrating an example of a result of a resolution reduction process;

FIGS. 19A and 19B are views illustrating examples of a result of a density correction process by a density correction processing section;

FIGS. 20A and 20B are views illustrating examples of the result of the density correction process by the density correction processing section;

DETAILED DESCRIPTION

A detailed description will be given hereinafter of an image compressing apparatus, an image outputting apparatus, an image reading apparatus, an image compressing method, a computer program, and a recording medium according to the present invention with reference to the accompanying drawings illustrating preferred embodiments thereof.

Embodiment 1

Hereinafter, an Image Forming Apparatus of Embodiment 1 will be described. In Embodiment 1, a description will be given of a configuration in which an image outputting apparatus of the present invention is applied to a digital color multi-function printer (an image forming apparatus) having a color copying function, a color scanner function, a printer function, a facsimile communication function, and a scan to e-mail function. Note that the present invention can be applied not only to the digital color multi-function printer but also to a digital color copier and a multi-function printer for a monochrome image. In Embodiment 1, a configuration in which an image compressing apparatus of the present invention serves a part of the image forming apparatus for forming a color image will be described as an example.

Figure 1:
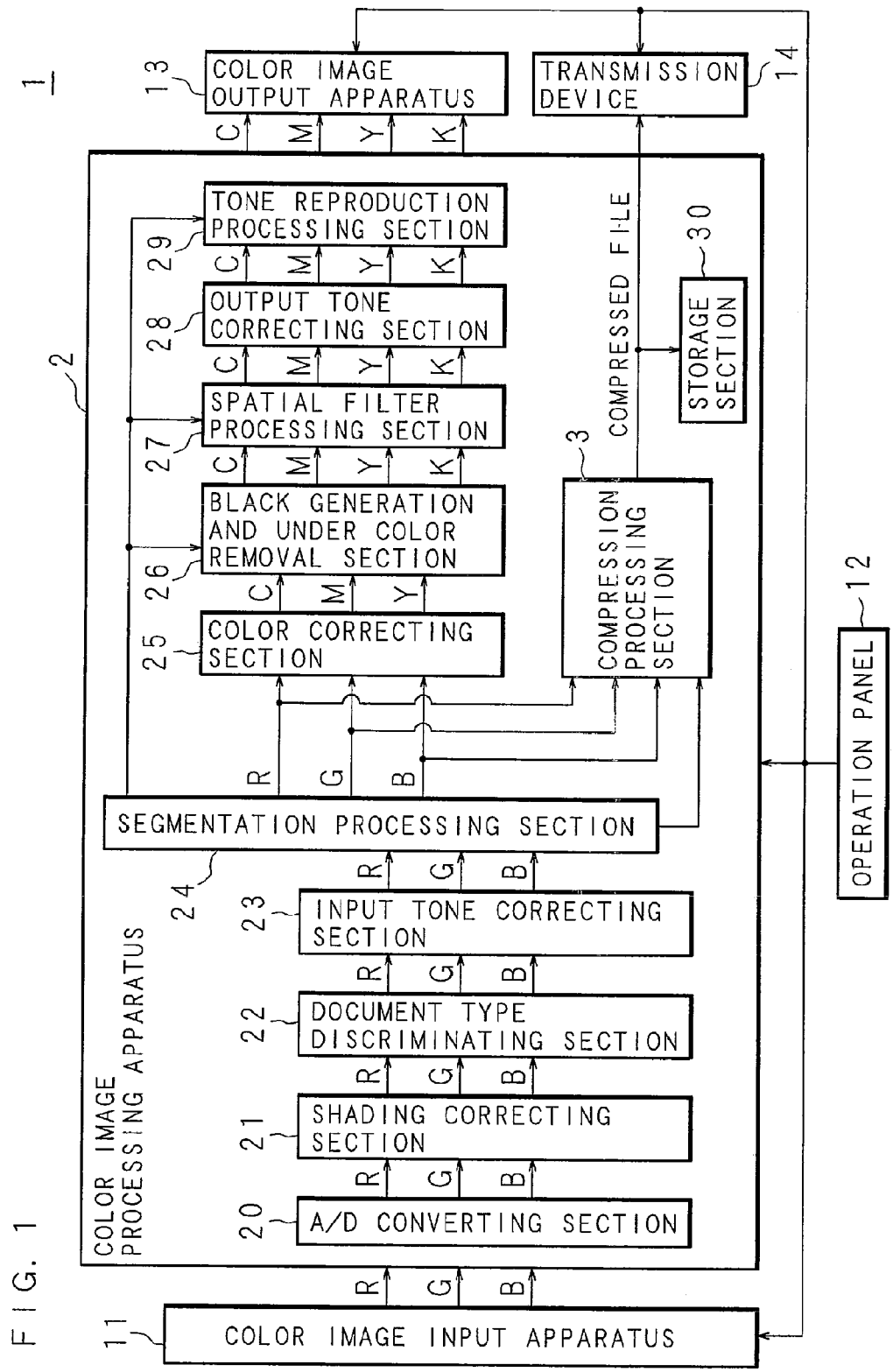
FIG. 1 is a block diagram illustrating functions of an image forming apparatus of Embodiment 1.

FIG. 1 is a block diagram illustrating functions of an image forming apparatus 1 of Embodiment 1. The image forming apparatus 1 of Embodiment 1 includes a color image input apparatus 11 for optically reading a color image from a document. To the color image input apparatus 11, there is connected a color image processing apparatus 2 for generating image data and compressed image data (a compressed file) in correspondence to the read color image. To the color image processing apparatus 2, there are connected a color image output apparatus 13 for outputting a color image on the basis of the image data generated by the color image processing apparatus 2, and a transmission device 14 for transmitting the compressed file generated by the color image processing apparatus 2 to the outside. To the color image input apparatus 11, the color image processing apparatus 2, the color image output apparatus 13, and the transmission device 14, an operation panel 12 for receiving operations from a user is connected.

Various processes executed in the image forming apparatus 1 are controlled by a CPU (Central Processing Unit) that is not illustrated. The CPU of the image forming apparatus 1 performs data communication with a computer and other digital multi-function printers connected to networks via a network card and a LAN cable that are not illustrated.

Next, structures of individual portions of the image forming apparatus 1 will be described. The operation panel 12 includes an operation section having a setting button and a numeric keypad for a user to set operational modes of the image forming apparatus 1, and a display section such as a liquid crystal display or the like. Operations of the individual portions of the image forming apparatus 1 are controlled on the basis of information inputted using the operation panel 12.

The color image input apparatus 11 is comprised of, e.g., a color scanner having a CCD (Charge Coupled Device), and reads an optical image reflected from a document as RGB (R: red, G: green, B: blue) analog signals by using the CCD and outputs the RGB analog signals to the color image processing apparatus 2.

The color image processing apparatus 2 generates image data including RGB digital signals (hereinafter referred to as RGB signals) by executing image processes described later on the RGB analog signals inputted from the color image input apparatus 11 in an A/D converting section 20, a shading correcting section 21, a document type discriminating section 22, an input tone correcting section 23, and a segmentation processing section 24. Hereinafter, respective intensities of the RGB signals are represented by R, G, and B.

In addition, the color image processing apparatus 2 generates image data including CMYK (C: cyan, M: magenta, y: yellow, K: black) digital signals by executing image processes described later on the RGB signals outputted from the segmentation processing section 24 in a color correcting section 25, a black generation and under color removal section 26, a spatial filter processing section 27, an output tone correcting section 28, and a tone reproduction processing section 29, and outputs the generated image data to the color image output apparatus 13 as a stream. Note that the color image processing apparatus 2 may also store the image data temporarily in a storage section 30 as a nonvolatile storage device such as a hard disk or the like before outputting the image data to the color image output apparatus 13.

The color image output apparatus 13 forms a color image on a recording sheet (e.g., a recording paper sheet) on the basis of the image data inputted from the color image processing apparatus 2 using a thermal transfer, electrophotographic, or inkjet method, and outputs the recording sheet. Note that the image forming apparatus 1 may include a monochrome image output apparatus for forming a monochrome image on a recording sheet and outputting the recording sheet instead of the color image output apparatus 13. In this case, the color image processing apparatus 2 converts the image data of the color image into image data of the monochrome image, and then outputs the image data to the monochrome image output apparatus.

Further, the color image processing apparatus 2 generates a compressed file having compressed image data of the color image by executing an image compression process described later on the RGB signals outputted from the segmentation processing section 24 in a compression processing section 3, and outputs the generated compressed file to the transmission device 14. The compression processing section 3 functions as the image compressing apparatus of the present invention. Note that the color image processing apparatus 2 may also store the compressed file in the storage section 30 temporarily before outputting the compressed file to the transmission device 14.

The transmission device 14 is comprised of a network card, a modem, or the like. The transmission device 14 is connectable to a communication network (not illustrated) such as a public line network, a LAN (Local Area Network), or the Internet, and transmits the compressed file to the outside via the communication network using a communication method such as facsimile or e-mail. For example, when a scan to e-mail mode is selected in the operation panel 12, the transmission device 14 attaches the compressed file to an e-mail, and then transmits the e-mail to a set destination.

Note that, when facsimile transmission is performed in the transmission device 14, the CPU of the image forming apparatus 1 performs a communication procedure with an originating transmission device in the transmission device 14, and successively transmits, when a state available for transmission is secured, the compressed file to the originating transmission device via a communication line after performing required processes such as a change of a compression format and the like on the compressed file.

In addition, when facsimile reception is performed in the transmission device 14, the CPU of the image forming apparatus 1 receives the compressed file transmitted from the originating transmission device while performing the communication procedure in the transmission device 14, and inputs the received compressed file to the color image processing apparatus 2. The color image processing apparatus 2 performs a decompression process on the received compressed file in a decompression processing section (not illustrated). The color image processing apparatus 2 performs a rotation process and/or a resolution conversion process on the image data of the color image obtained by decompressing the compressed file on an as needed basis in a processing section (not illustrated), also performs output tone correction in the output tone correcting section 28, and performs a tone reproduction process in the tone reproduction processing section 29. Further, the color image processing apparatus 2 outputs the image data having been subjected to various image processes to the color image output apparatus 13, and the color image output apparatus 13 forms a color image on a recording sheet on the basis of the image data.

Subsequently, the image processes and the compression processes in the color image processing apparatus 2 will be described. The A/D converting section 20 receives the RGB analog signals inputted to the color image processing apparatus 2 from the color image input apparatus 11, converts the RGB analog signals into the RGB digital signals (i.e., the RGB signals), and outputs the converted RGB signals to the shading correcting section 21.

The shading correcting section 21 performs, on the RGB signals inputted from the A/D converting section 20, a process for removing various distortions caused in a lighting system, an image focusing system, and an image sensing system of the color image input apparatus 11. The shading correcting section 21 outputs the RGB signals with the distortions removed therefrom to the document type discriminating section 22.

The document type discriminating section 22 converts the RGB reflectance signals inputted from the shading correcting section 21 into density signals indicative of densities of the individual RGB colors, and executes a document type discrimination process for discriminating among document modes such as a text, a printed-picture, and a photograph (continuous tone). The document type discriminating section 22 outputs the process result of the document type discrimination process to the input tone correcting section 23 together with the RGB signals inputted from the shading correcting section 21, and the process result of the document type discrimination process is thereby reflected in the image processes at subsequent stages. Note that, when a user sets the document type discrimination process to a manual setting using the operation panel 12, the document type discriminating section 22 outputs only the RGB signals inputted from the shading correcting section 21 directly to the input tone correcting section 23 at the subsequent stage.

The input tone correcting section 23 performs, on the RGB signals, an image quality adjustment process such as adjustment of color balance, removal of a page-background density, and adjustment of contrast in accordance with the result of the document type discrimination process. The input tone correcting section 23 outputs the RGB signals having been subjected to the process to the segmentation processing section 24.

The segmentation processing section 24 separates individual pixels in an image represented by the RGB signals inputted from the input tone correcting section 23 into one of a text segment (a black text segment, a color text segment), a halftone dot segment, and a photograph segment. In addition, on the basis of the segmentation result, the segmentation processing section 24 outputs a segmentation class signal, which is based on the separation results and represents a corresponding region of the interest pixel, to the black generation and under color removal section 26, the spatial filter processing section 27, the tone reproduction processing section 29, and the compression processing section 3. Further, the segmentation processing section 24 outputs the RGB signals inputted from the input tone correcting section 23 directly to the color correcting section 25 and the compression processing section 3 at the subsequent stage.

The color correcting section 25 converts the RGB signals inputted from the segmentation processing section 24 into CMY digital signals (hereinafter referred to as CMY signals), and performs a process for removing color impurity on the basis of spectral characteristics of CMY color materials including useless absorption components from the CMY signals in order to achieve high fidelity in color reproduction. The color correcting section 25 outputs the CMY signals having been subjected to the color correction to the black generation and under color removal section 26.

In accordance with each segment indicated by the segmentation class signal inputted from the segmentation processing section 24, the black generation and under color removal section 26 performs, on the basis of the CMY signals inputted from the color correcting section 25, a black generation process for generating a black (K) signal from the CMY signals, and a process for generating new CMY signals by subtracting the K signal obtained in the black generation from the original CMY signals. As the result thereof, the CMY three-color digital signals are converted into CMYK four-color digital signals (hereinafter referred to as CMYK signals). The black generation and under color removal section 26 outputs the CMYK signals obtained by converting the CMY signals to the spatial filter processing section 27.

As an example of the black generation process performed by the black generation and under color removal section 26, there is employed a method for performing the black generation using skeleton black. In this method, when it is assumed that input/output characteristics of a skeleton curve are represented by y=f(x), input data are represented by C, M and Y, output data are represented by C', M', Y' and K', and a UCR (Under Color Removal) ratio is represented by α (0<α<1), data outputted by the black generation and under color removal process are given by the following Expressions (1) to (4):

$$K'=f(\min(C,M,Y)) \quad (1)$$

$$C'=C-\alpha K' \quad (2)$$

$$M'=M-\alpha K' \quad (3)$$

$$Y'=Y-\alpha K' \quad (4)$$

Herein, the UCR ratio α (0<α<1) indicates a degree of reduction in C, M, and Y by replacing a portion where C, M, and Y overlap each other with K. Expression (1) denotes that the K signal is generated in accordance with the minimum signal intensity among respective signal intensities of C, M, and Y.

The spatial filter processing section 27 performs, on image data of the CMYK signals inputted from the black generation and under color removal section 26, a spatial filter process using a digital filter on the basis of the segmentation class signal inputted from the segmentation processing section 24. With this operation, spatial frequency characteristics of the image data are corrected, and blurring or graininess degradation of an output image in the color image output apparatus 13 is improved. For example, the spatial filter processing section 27 performs, on a segment separated as a text by the segmentation processing section 24, a spatial filter process using a filter having large enhancement of a high-frequency component in order to enhance reproducibility of the text. In addition, the spatial filter processing section 27 performs, on a segment separated as a halftone dot by the segmentation processing section 24, a low-pass filter process for removing an input halftone dot component. The spatial filter processing section 27 outputs the CMYK signals having been subjected to the process to the output tone correcting section 28.

The output tone correcting section 28 performs, on the CMYK signals inputted from the spatial filter processing section 27, an output tone correction process on the basis of a halftone area ratio in correspondence to characteristics of the color image output apparatus 13, and outputs the CMYK signals having been subjected to the output tone correcting process to the tone reproduction processing section 29.

The tone reproduction processing section 29 performs, on the CMYK signals inputted from the output tone correcting section 28, a halftone process in correspondence to the segment on the basis of the segmentation class signal inputted from the segmentation processing section 24. For example, the tone reproduction processing section 29 performs, on a segment separated as the text by the segmentation processing section 24, a binarization process or a multi-level dithering process in a high-resolution screen suitable for the reproduction of the high-frequency component. In addition, the tone reproduction processing section 29 performs, on a segment separated as the halftone by the segmentation processing section 24, the binarization process or the multi-level dithering process in a screen suitable for tone reproduction. The tone reproduction processing section 29 outputs the image data having been subjected to the process to the color image output apparatus 13.

The color image processing apparatus 2 temporarily stores the image data (the CMYK signals) having been subjected to the process in the tone reproduction processing section 29 in the storage section (e.g., the storage section 30), reads the image data stored in the storage section at a predetermined timing for image formation, and outputs the read image data to the color image output apparatus 13. The control of these operations is performed by, e.g., the CPU (not illustrated).

The compression processing section 3 generates a compressed file on the basis of the image data including the segmentation class signal and the RGB signals inputted from the segmentation processing section 24 by employing the image compressing method of the present invention. Hereinafter, the structure of the compression processing section 3 and the processes performed thereby will be described in detail.

A color image (image data) to be inputted to the compression processing section 3 is made of a plurality of pixels disposed in matrix. The compression processing section 3 separates inputted image data into a foreground layer and a background layer. Subsequently, the compression processing section 3 converts the foreground layer into a binary image, then performs lossless compression on the binary image using, e.g., MMR, and performs lossy compression on the background layer using, e.g., JPEG. Additionally, the compression processing section 3 groups the lossless compressed foreground layer (the binary image), the lossy compressed background layer, and decompression information for decompressing the layers into image data of a color image together into one file. This file is a compressed file. As the decompression information, information indicative of a compression format, an index color table (hereinafter referred to as an IC table), and the like are used. Such compressed file has a small file size and suppresses degradation in image quality when compared with the case where image data of a color image is directly compressed, or the case where the foreground layer and the background layer are compressed. Further, it is sufficient to have one lossless compression means for a binary image and one lossy compression means for a background layer, and hence it is not necessary to have three or more compression means.

Figure 2A:
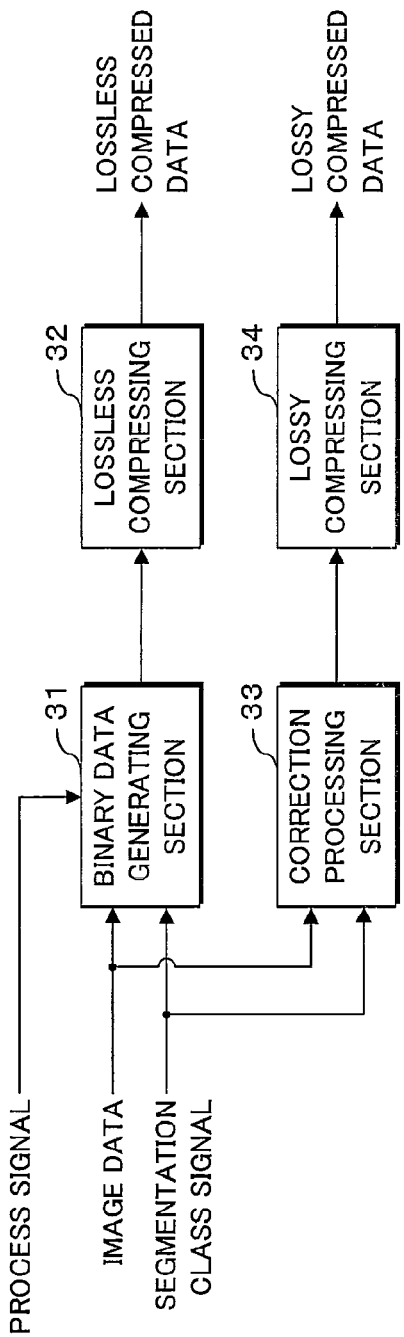
FIGS. 2A and 2B are block diagrams each illustrating an internal structure of a compression processing section.
Figure 2B:
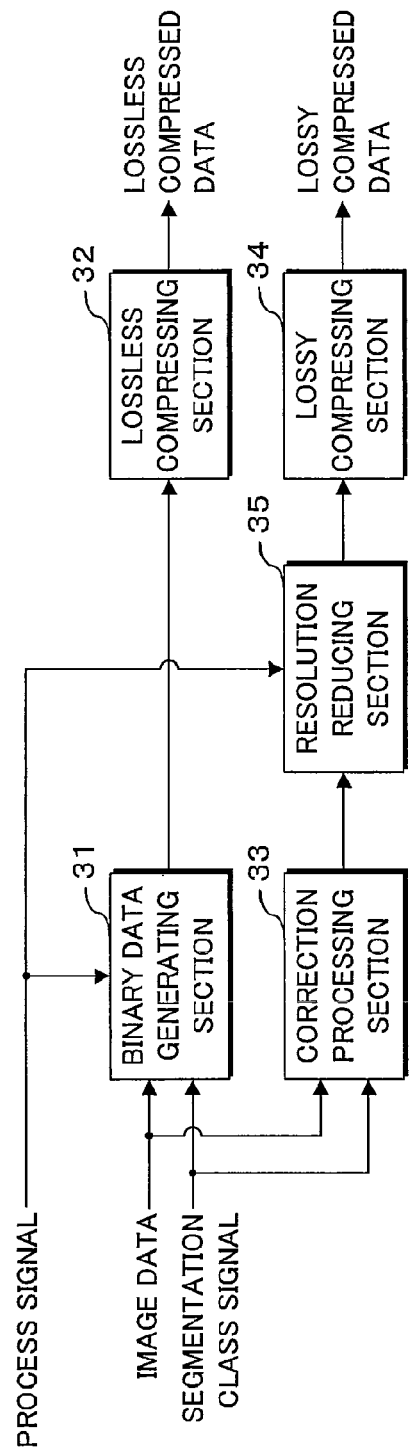

FIGS. 2A and 2B, and FIGS. 3A and 3B are block diagrams each illustrating an internal structure of the compression processing section 3. Note that FIG. 2A illustrates the structure of the compression processing section 3 of Embodiment 1, while FIG. 2B and FIGS. 3A and 3B illustrate examples of other structures of the compression processing section 3. As illustrated in FIG. 2A, the compression processing section 3 includes a binary data generating section 31, a lossless compressing section 32, a correction processing section 33, and a lossy compressing section 34. The RGB signals (the image data) and the segmentation class signal from the segmentation processing section 24 are inputted to the binary data generating section 31 and the correction processing section 33.

In addition, a process signal indicative of setting information related to the compression process set by a user via the operation panel 12 is inputted to the binary data generating section 31. Note that examples of the setting information include the type of a file format of a compressed file generated by the compression processing section 3, whether or not an ultra-fine mode for instructing the execution of a compression process prioritizing image quality is selected, and whether or not a high compression mode for instructing the execution of a compression process at a high compression ratio is selected. Further, examples of the setting information include whether or not a black text emphasis mode for instructing the execution of a compression process emphasizing the visibility of a black text is selected, and whether or not a two-color text mode for instructing the execution of a compression process emphasizing the visibility of texts of two colors including the black text is selected.

The binary data generating section 31 generates a foreground layer representing a text from inputted image data on the basis of the segmentation class signal and the process signal. For example, when the process signal indicative of the selection of the black text emphasis mode is inputted, the binary data generating section 31 extracts a black text segment signal from the segmentation class signals, and generates a binary image (binary data) in which pixels in correspondence to an edge of the black text are binarized, whereby the foreground layer is generated. Further, when the process signal indicative of the selection of the two-color text mode is inputted, the binary data generating section 31 extracts the black text segment signal and a color text segment signal of one color specified by a user from the segmentation class signals, and generates binary images (foreground layers) in which pixels in correspondence to respective edges of the black text and the color text are binarized for the black text and the color text. The binary data generating section 31 outputs the generated foreground layer to the lossless compressing section 32.

The lossless compressing section 32 performs lossless compression on the foreground layer inputted from the binary data generating section 31. Note that, when the binary data generating section 31 generates the foreground layers for the black text and the color text, the lossless compressing section 32 performs the lossless compression on their respective foreground layer.

The binary data generating section 31, which has detected the black text segment or the black text segment, outputs a signal indicative of the black text segment or the color text segment to the correction processing section 33, and the correction processing section 33 performs a process for identifying pixels included in the black text segment or the color text segment on the basis of the signal indicative of the black text segment or the color text segment inputted from the binary data generating section 31.

The correction processing section 33 performs a filter correction for reducing a density gradient of a region to be subjected to the lossless compression, namely, pixels in correspondence to the foreground layer and its surrounding pixels on the basis of the signal indicative of the black text segment inputted from the binary data generating section 31 (the signal indicative of the color text segment is included when the two-color text mode is selected) to generate a background layer. Specifically, the correction processing section 33 performs a process for identifying individual pixels included in the black text segment from the image on the basis of the signal indicative of the black text segment inputted from the binary data generating section 31, and reducing the difference in density between the pixels in the black text segment and the other pixels. That is, a filter process is performed on pixels on the edge of the black text such that the difference in density between the pixels and pixels in the vicinity of the edge is reduced.

Note that, when the two-color text mode is selected, the correction processing section 33 performs a process for identifying individual pixels included in the black text segment or the color text segment from the image on the basis of the signal indicative of the black text segment and the signal indicative of the color text segment that are inputted from the binary data generating section 31, and reducing the difference in density between the pixels in the black text segment and the color text segment, and the other pixels. That is, a filter process is performed on pixels on the black text edge and the color text edge such that the difference in density between to the pixels thereon and pixels in the vicinity of the edges. Further, the correction processing section 33 performs a density smoothing process on pixels other than pixels in correspondence to a region to be subjected to the lossless compression (the foreground layer). The correction processing section 33 generates the background layer by performing such filter process and smoothing process, and outputs the generated background layer to the lossy compressing section 34.

Note that, in the case of a configuration in which the signal indicative of the black text segment and the signal indicative of the color text segment are not inputted from the binary data generating section 31, the correction processing section 33 performs the same process as that of the binary data generating section 31, and thereby determines whether the individual pixels are pixels included in the edge of the black text or the edge of the color text. Specifically, the correction processing section 33 identifies pixels in correspondence to the edge of the black text and pixels in correspondence to the edge of the color text on the basis of the segmentation class signal.

The lossy compressing section 34 performs lossy compression on the background layer inputted from the correction processing section 33 at a compression ratio higher than that of the lossless compressing section 32.

The compression processing section 3 groups the foreground layer having been subjected to the lossless compression in the lossless compressing section 32 (lossless compressed data), the background layer having been subjected to the lossy compression in the lossy compressing section 34 (lossy compressed data), and the decompression information such as the IC table or the like together into one file to generate a compressed file.

The color image processing apparatus 2 temporarily stores the compressed file generated in the compression processing section 3 in the storage section 30, reads the compressed file stored in the storage section 30 at a predetermined timing for image transmission, and outputs the read compressed file to the transmission device 14. Note that the control of the individual portions is performed by, e.g., the CPU.

Note that, when the color image processing apparatus 2 is operated at, e.g., a setting in which the segmentation circuit (the segmentation processing section 24) is not used, or when the color image processing apparatus 2 does not have the segmentation circuit, the segmentation class signal for determining each pixel belongs to the black text (edge) or the color text (edge) is not inputted to the compression processing section 3. Consequently, in this case, the binary data generating section 31 performs a process for detecting the text edge and a process for judging a black pixel (a process for judging a color pixel) to generate binary masks (the foreground layers) of the black text (and the color text).

As the process for detecting the edge, typical edge detection filter processes such as a Sobel edge detection filter and the like can be used. In addition, as the process for judging the black pixel, it is possible to use a process in which it is determined whether or not R=G=B≤TH1 is satisfied on each pixel in the image and, when R=G=B≤TH1 is satisfied, the pixel is determined as the black pixel. Herein, TH1 is a threshold value of a RGB signal intensity for determining the color of each pixel as black, and is a value pre-stored in the binary data generating section 31. Further, as the process for judging the black pixel, it is also possible to use a process in which, when |R−G|, |G−B|, and |B−R| are not more than a predetermined threshold value (TH2) and R, G, and B are not more than TH1, the pixel is determined as the black pixel. Herein, TH2 is a value smaller than TH1, and is pre-stored in the binary data generating section 31. Note that the individual threshold values may be set by calculating values with which the black pixel can be appropriately judged using various image samples. For example, when a text having a luminance of up to about 40% is assumed to be the black text, TH1 can be set to satisfy TH1=94 and, when a color difference of up to about 5 is assumed to be permitted, TH2 can be set to satisfy TH2=14.

Additionally, as the process for judging the color pixel, it is possible to use a process in which, in the case where RGB values of a representative color (one of red, green, blue, cyan, magenta, and yellow) selected by a user are assumed to be Rt, Gt, and Bt, when |R−Rt|, |G−Gt|, and |B−Bt| are not more than a predetermined threshold value (TH2), the pixel is determined as the color pixel of the representative color. Herein, for example, when the color difference of up to about 5 is assumed to be permitted, TH2 can be set to satisfy TH2=14.

Hereinafter, variations of the compression processing section 3 will be described. FIG. 2B illustrates the compression processing section 3 having a configuration in which the resolution of the background layer is reduced. The compression processing section 3 illustrated in FIG. 2B includes a resolution reducing section 35 that reduces the resolution of the background layer in addition to the binary data generating section 31, the lossless compressing section 32, the correction processing section 33, and the lossy compressing section 34. The correction processing section 33 outputs the background layer to the resolution reducing section 35, the resolution reducing section 35 converts the background layer inputted from the correction processing section 33 into a low-resolution image, and outputs the background layer of which the resolution is reduced to the lossy compressing section 34. The lossy compressing section 34 performs the lossy compression on the background layer inputted from the resolution reducing section 35. The binary data generating section 31 and the lossless compressing section 32 perform the same processes as those described above.

Note that the process signal indicative of the setting information related to the compression process set by a user via the operation panel 12 is inputted in the resolution reducing section 35 and, when the process signal indicative of the selection of the high compression mode is inputted therein, the resolution reducing section 35 reduces the resolution of the background layer, as described above. By performing the reduction of the resolution of the background layer in this manner, the data size of the compressed file can be further reduced.

On the other hand, when the process signal indicative of the selection of the ultra-fine mode is inputted therein, the resolution reducing section 35 outputs the background layer directly to the lossy compressing section 34 without reducing the resolution of the background layer. When the reduction of the resolution of the background layer is not performed as described above, the degradation in the image quality of the background layer can be avoided. As the resolution reduction process, any resolution conversion (scaling) process such as simple thinning, nearest neighbor, bilinear, or bicubic process may be used.

FIG. 3A illustrates the compression processing section 3 having a configuration in which density correction of the background layer is performed. The compression processing section 3 illustrated in FIG. 3A includes density correction processing sections 36 and 37 for performing the density correction of the background layer in addition to the binary data generating section 31, the lossless compressing section 32, the correction processing section 33, and the lossy compressing section 34. The image data and the segmentation class signal from the segmentation processing section 24 are inputted to the density correction processing section 36. The density correction processing section 36 performs a density correction process for increasing the density of a pixel included in the image. The density correction processing section 36 outputs the image data having been subjected to the density correction to the correction processing section 33, and the correction processing section 33 generates the background layer from the image data inputted from the density correction processing section 36 and outputs the generated background layer to the density correction processing section 37. The density correction processing section 37 performs a density correction process for increasing the density of a pixel included in the background layer inputted from the correction processing section 33, and outputs the background layer having been subjected to the density correction to the lossy compressing section 34. The lossy compressing section 34 performs the lossy compression on the background layer inputted from the density correction processing section 37. The binary data generating section 31 and the lossless compressing section 32 perform the same processes as those described above.

FIG. 3B illustrates the compression processing section 3 having a configuration in which the resolution reduction and the density correction of the background layer are performed. The compression processing section 3 illustrated in FIG. 3B includes the resolution reducing section 35 and the density correction processing sections 36 and 37 in addition to the binary data generating section 31, the lossless compressing section 32, the correction processing section 33, and the lossy compressing section 34. The density correction processing section 36 outputs the image data having been subjected to the density correction to the correction processing section 33, and the correction processing section 33 generates the background layer from the image data inputted from the density correction processing section 36 and outputs the generated background layer to the resolution reducing section 35. The resolution reducing section 35 converts the background layer inputted from the correction processing section 33 into the low-resolution image, and outputs the background layer of which the resolution is reduced to the density correction processing section 37. The density correction processing section 37 performs the density correction process on the background layer inputted from the resolution reducing section 35, and outputs the background layer having been subjected to the density correction to the lossy compressing section 34. The lossy compressing section 34 performs the lossy compression on the background layer inputted from the density correction processing section 37. The binary data generating section 31 and the lossless compressing section 32 perform the same processes as those described above.

Figure 4:
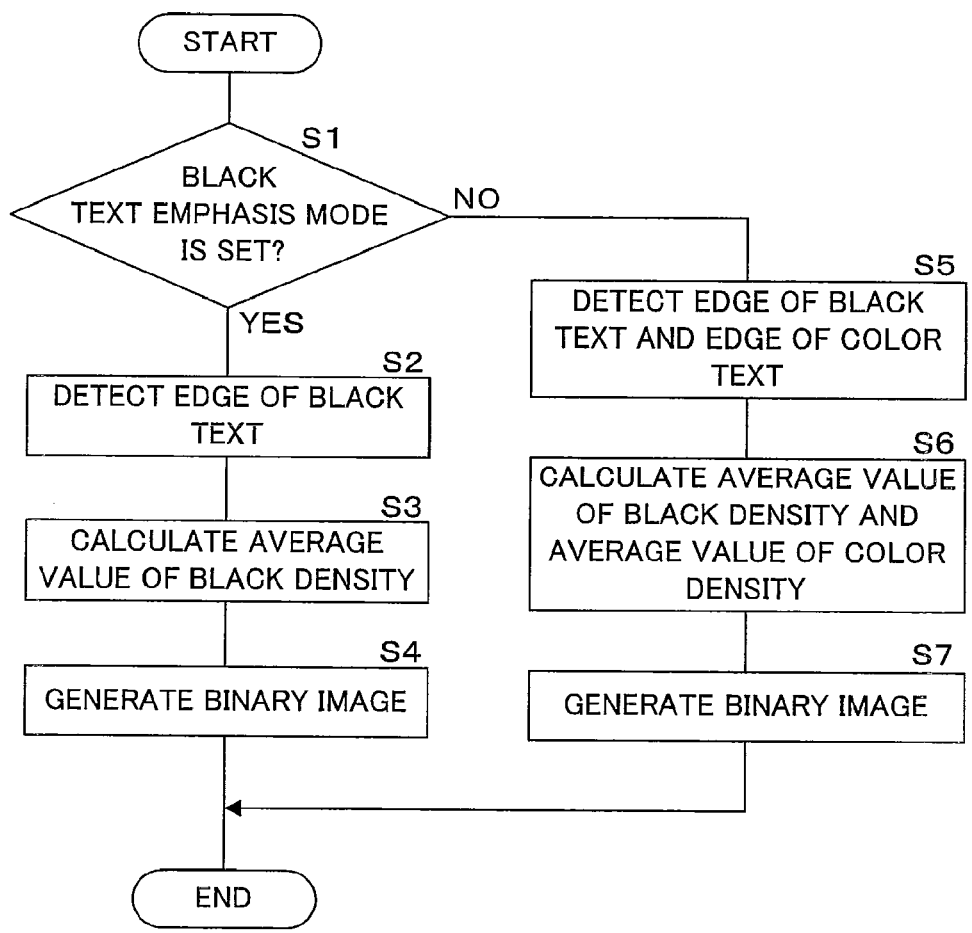
FIG. 4 is a flowchart illustrating procedures in processes performed by a binary data generating section.

Next, processes by the binary data generating section 31 will be described. FIG. 4 is a flowchart illustrating procedures in the processes performed by the binary data generating section 31. The binary data generating section 31 determines whether the black text emphasis mode is set, or the two-color text mode is set on the basis of the setting made by a user via the operation panel 12 (S1). When determining that the black text emphasis mode is set (S1: YES), on the basis of the text segment signal indicating that the pixel is included in the black text segment among the segmentation class signals inputted from the segmentation processing section 24, the binary data generating section 31 detects the edge of the black text included in the image based on the image data inputted from the segmentation processing section 24 (S2).

Figures 5A, 5B, 5C, 5D:
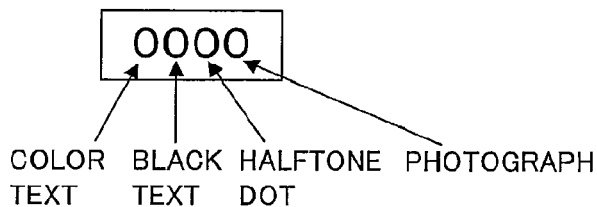
FIGS. 5A to 5D are conceptual views illustrating an example of detection of an edge of a black text or a color text.

FIGS. 5A to 5D are conceptual views illustrating an example of detection of the edge of the black text or the color text. FIG. 5A illustrates an example of a format of the segmentation class signal. In the example illustrated in FIG. 5A, the segmentation class signal is a 4-bit signal in which it is assumed that the left end bit indicates the color text segment, the second bit from the left indicates the black text segment, the third bit from the left indicates the halftone dot segment, and the right end bit indicates the photograph segment. When the bit is 1, the pixel is included in the segment indicated by the bit and, when the bit is 0, the pixel is not included in the segment indicated by the bit. FIG. 5B illustrates an example in which the segmentation class signal is associated with each pixel in an image. Among pixels included in the image, by extracting pixels each in which the bit indicative of the black text segment is 1, the black text segment in the image is detected. Further, among the extracted pixels, by removing a pixel having two neighboring pixels on both sides, four neighboring pixels, or eight neighboring pixels belonging to the black text segment, it follows that the remaining pixels are pixels in correspondence to the edge of the black text, and thus the edge of the black text is detected. FIG. 5C illustrates a state where, among pixels illustrated in FIG. 5B, pixels in correspondence to the edge of the black text are indicated by 1, and the other pixels are indicated by 0. With the step S2, a binary mask representing the edge of the black text as illustrated in FIG. 5C is obtained.

Note that, in the case of a configuration in which the segmentation class signal is not inputted from the segmentation processing section 24, the binary data generating section 31 detects the edge of the black text by performing the process for detecting the text edge and the process for judging the black pixel in the step S1. FIGS. 6A to 8 are conceptual views illustrating an example of detection of the edge of the black text using the filter process and the process for judging the black pixel. FIG. 6A illustrates an image in which densities of individual pixels are indicated by values 0 to 255. FIGS. 6B and 6C illustrate vertical and horizontal types of 3×3 Sobel edge detection filters. FIG. 7A illustrates the result of calculation of absolute values after addition of a filter result obtained by applying the two types of the Sobel edge detection filters illustrated in FIGS. 6B and 6C to the image illustrated in FIG. 6A. Values corresponding to pixels in correspondence to a portion other than the text edge are set to 0, and pixels in correspondence to larger values are detected as the text edge.

Subsequently, the binary data generating section 31 sets values larger than a predetermined threshold value to 1 and values not more than the threshold value to 0, and thereby performs the binarization of the result of detection of the edge. FIG. 7B illustrates the result of the binarization by setting the threshold value to 500. As the result of the binarization, pixels in correspondence to 1 are detected as the text edge. Subsequently, the binary data generating section 31 performs a process in which it is determined whether or not the pixel in correspondence to the value of 1 as the result of the binarization is the black pixel and, when the pixel is the black pixel, a value corresponding to the pixel is set to 1 and, when the pixel is not the black pixel, a value corresponding to the pixel is set to 0. As the process for judging the black pixel, as described above, there is performed the process for determining whether or not R=G=B≤TH1 is satisfied, or whether or not |R−G|, |G−B|, and |B−R| are not more than TH2 and R, G, and B are not more than TH1. FIG. 8 illustrates the result of judgment of the black pixel when it is assumed that RGB values of each pixel in the image illustrated in FIG. 6A satisfy R=G=B, and TH1=60 and TH2=10 are established. In FIG. 8, pixels in correspondence to the value of 1 are pixels finally detected as the edge of the black text.

After the completion of the step S1, the binary data generating section 31 calculates the average value of black densities in the edge of the black text by calculating the sum of density values in pixels detected as the edge of the black text, counting the number of pixels of the edge of the black text, and dividing the sum of density values by the number of pixels (S3). As the density value of the pixel, for example, the average value of R, G, and B values is used. The compression processing section 3 uses the calculated average value of the black densities as black text information indicative of the black density of the black text. With this operation, it becomes possible to replace the edge of the black text at a density as close as possible to the black density of the image before being compressed. Note that the black density may be preset as a fixed value and the step S2 may be omitted in order to simplify the processes.

Next, the binary data generating section 31 generates the foreground layer by generating the binary image from the inputted image using a method in which density values of pixels in correspondence to the detected edge of the black text are set to 1 and density values of the other pixels are set to 0, or the like. (S4). The binary data generating section 31, which has generated the foreground layer, outputs the foreground layer and the black text information to the lossless compressing section 32, and ends the processes.

When determining that the two-color text mode is set in the step S1 (S1: NO), the binary data generating section 31 detects the edge of the black text and the edge of the color text included in the image based on the image data inputted from the segmentation processing section 24 on the basis of the text segment signal indicating that the pixel is included in the black text segment and the text segment signal indicating that the text is included in the color text segment among the segmentation class signals inputted from the segmentation processing section 24 (S5).

Herein, the binary data generating section 31 detects the black text segment and the color text segment in the image by extracting pixels each in which the bit indicative of the black text segment is 1 and pixels each in which the bit indicative of the color text segment is 1 among pixels included in the image. Further, the binary data generating section 31 excludes a pixel having two neighboring pixels on both sides, four neighboring pixels, or eight neighboring pixels belonging to the black text segment or the color text segment from among the extracted pixels, whereby it follows that the remaining pixels are pixels in correspondence to the edge of the black text or the color text, and thus the edges of the black text and the color text are detected. FIG. 5D illustrates a state where, among the individual pixels illustrated in FIG. 5B, pixels in correspondence to the edge of the color text are indicated by 1, and the other pixels are indicated by 0. With the step S5, the binary mask representing the edge of the black text illustrated in FIG. 5C and a binary mask representing the edge of the color text illustrated in FIG. 5D are obtained.

Note that, in the case of the configuration in which the segmentation class signal is not inputted from the segmentation processing section 24, the binary data generating section 31 detects the edge of the black text by performing the above-described process for detecting the edge of the text and the above-described process for judging the black pixel in the step S5. In addition, the binary data generating section 31 performs a process in which the result of detection of the edge obtained by the process for detecting the edge of the text is binarized, it is determined whether or not the pixel in correspondence to the value of 1 as the result of the binarization is the color pixel, when the pixel is the color pixel, a value corresponding to the pixel is set to 1, and, when the pixel is not the color pixel, a value corresponding to the pixel is set to 0.

As the process for judging the color pixel, as described above, there is performed the process for determining whether or not |R−Rt|, |G−Gt|, and |B−Bt| are not more than TH2 when it is assumed that RGB values of a representative color selected by a user (one of red, green, blue, cyan, magenta, and yellow) are Rt, Gt, and Bt. When it is assumed that RGB values of a pixel in the vicinity of the pixel in correspondence to 1 in FIG. 7B satisfy |R−Rt|≤TH2, |G−Gt|≤TH2, and |B−Bt|≤TH2, and TH2=10 is established, the result of judgment of the color pixel illustrated in FIG. 8 is obtained. In FIG. 8, pixels in correspondence to the value of 1 are pixels finally detected as the edge of the color text.

After the completion of the step S5, the binary data generating section 31 calculates the average value of the black densities in the edge of the black text and the average value of color densities in the edge of the color text using the same process as that in the step S3. (S6). As the density value of the pixel, for example, the average value of R, G, and B values is used. In the compression processing section 3, the calculated average value of the black densities is used as the black text information indicative of the black density of the black text, while the average value of the color densities is used as color text information indicative of the color density of the color text. With this operation, it becomes possible to replace the edge of the black text edge and the edge of the color text at densities as close as possible to the black density and the color density of the image before being compressed. Note that the black density and the color density may be preset as fixed values and the step S6 may be omitted in order to simplify the processes.

Subsequently, the binary data generating section 31 generates the foreground layers by generating binary images in correspondence to the black text and the color text from the inputted image using a method in which density values of pixels in correspondence to the detected edge of the black text or the color text are set to 1 and density values of the other pixels are set to 0 or the like (S7). The binary data generating section 31, which has generated the foreground layers, outputs the foreground layers, the black text information, and the color text information to the lossless compressing section 32, and ends the processes.

Figure 9:
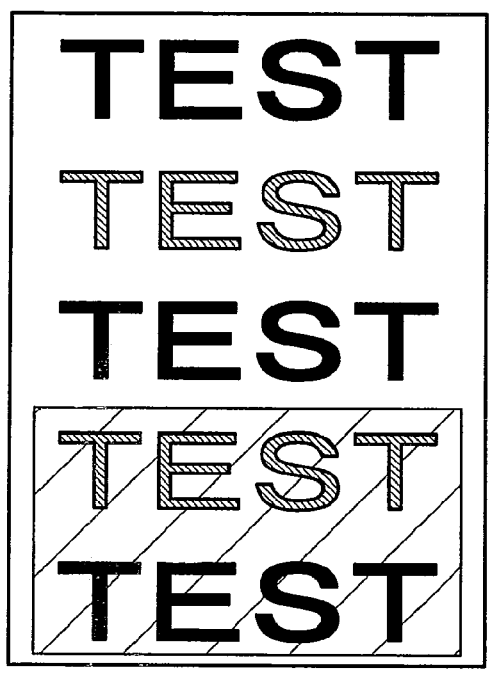
FIG. 9 is a schematic view illustrating an example of an inputted image.

Next, processes in which the binary data generating section 31 generates the binary image (the foreground layer) from the image data will be specifically described. FIG. 9 is a schematic view illustrating an example of the inputted image. Among texts "TEST" arranged in five rows included in the image illustrated in FIG. 9, texts in the first, third, and fifth rows are black texts, while texts in the second and fourth rows are color texts (texts formed of a chromatic color). In addition, the background of texts in the first, second, and third rows is white, while the background of texts in the fourth and fifth rows has a chromatic color.

Figure 10:
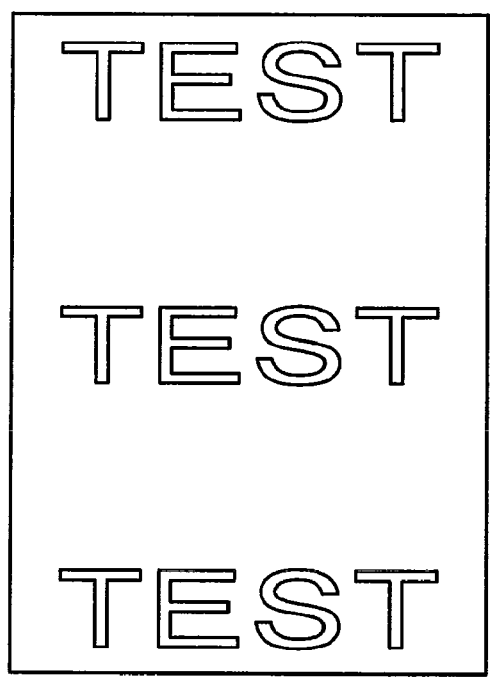
FIG. 10 is a schematic view illustrating an example of a foreground layer including the black text.

FIG. 10 is a schematic view illustrating an example of a foreground layer including the black text, and illustrates an example in which the edges of the black texts are detected from the image illustrated in FIG. 9, and the binary image is thereby generated. The black portion in the drawing is a portion where the density value of the pixel is 1, while the white portion in the drawing is a portion where the density value of the pixel is 0. Note that the density value of 0 denotes transparency. Among texts included in FIG. 9, when only the edges of the black texts are detected, the binary image as illustrated in FIG. 10, namely, the foreground layer is generated.

Figure 11:
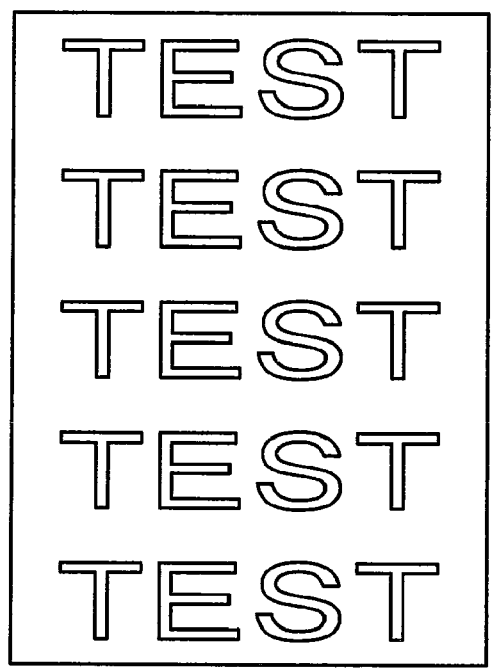
FIG. 11 is a schematic view illustrating a result obtained by performing only edge detection on the image.

FIG. 11 is a schematic view illustrating the result obtained by performing only edge detection on the image, and illustrates the result of detection of text edges from the image illustrated in FIG. 9. In the case of the configuration in which the segmentation class signal is not inputted from the segmentation processing section 24, the binary data generating section 31 obtains the result illustrated in FIG. 11 by detecting the edges of the texts. In this stage, as illustrated in FIG. 11, the edge of the black text and the edge of the color text are detected. The binary data generating section 31 obtains the binary image illustrated in FIG. 10 by performing the process for judging the black pixel on the result of the edge detection illustrated in FIG. 11.

Figure 12:
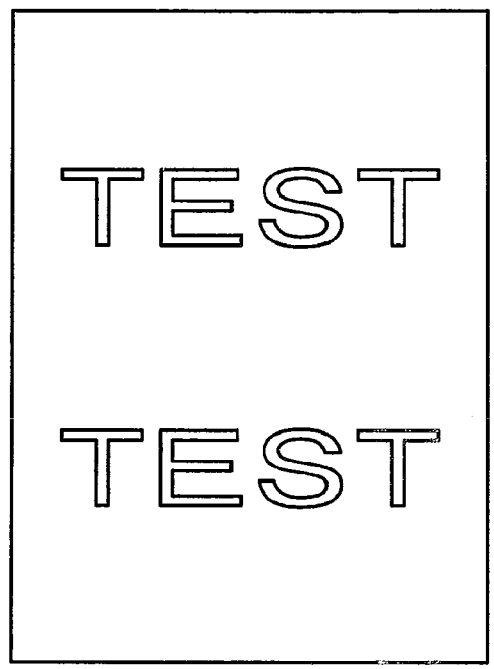
FIG. 12 is a schematic view illustrating an example of a foreground layer including the color text.

FIG. 12 is a schematic view illustrating an example of the foreground layer including the color text, and illustrates an example in which the binary image is generated by detecting the edges of the color texts of one color specified by a user. The black portion in the drawing is a portion where the density value of the pixel is 1, while the white portion in the drawing is a portion where the density of the pixel is 0. Note that the density value of 0 denotes transparency. Among the texts included in FIG. 9, when the edges of the black texts and the edges of the color texts are detected, the binary image illustrated in FIG. 10 (the foreground layer of the black text) and the binary image illustrated in FIG. 12 (the foreground layer of the color text) are generated. In the case of the configuration in which the segmentation class signal is not inputted from the segmentation processing section 24, the binary data generating section 31 detects the edges of the texts, obtains the result illustrated in FIG. 11, performs the process for judging the color pixel on the obtained result of the edge detection, and thereby obtains the binary image illustrated in FIG. 12.

In addition, in the binary image illustrated in FIG. 10, the binary data generating section 31 calculates the sum of black densities (e.g., average values of R, G, and B values) of pixels in correspondence to 1 (the edge of the black text) and the number of pixels in advance, and calculates a representative value (an average value) of the black densities. If the sum of the black densities is 72000 and the number of pixels is 3600, the representative value of the black densities is 72000/3600=20. Similarly, in the binary image illustrated in FIG. 12, the binary data generating section 31 calculates the sums of color densities (e.g., R, G, and B values) of pixels in correspondence to 1 (the edge of the color text) and the number of pixels in advance, and calculates representative values (average values) of the color densities. If the sums of color densities are R=720000, G=3600, and B=3600, and the number of pixels is 3600, the representative values of the color densities are R=720000/3600=200, G=3600/3600=1, and B=3600/3600=1, and (R, G, B)=(200, 1, 1) is established.

Next, processes in which the correction processing section 33 generates the background layer from the image data will be specifically described. The correction processing section 33 successively selects pixels included in the image, and determines whether or not each pixel (a target pixel) is a pixel included in the edge of the black text on the basis of the signal indicative of the black text segment inputted from the binary data generating section 31. Note that, in the case of a configuration in which the signal indicative of the black text segment is not inputted from the binary data generating section 31, the correction processing section 33 determines whether or not each pixel (the target pixel) is a pixel included in the edge of the black text by performing the same process as that of the binary data generating section 31. Specifically, the correction processing section 33 determines whether or not the target pixel is a pixel in which the bit indicative of the black text segment of the segmentation class signal is 1. Note that, when the two-color text mode is set, the correction processing section 33 determines whether the target pixel is a pixel included in the edge of the black text or a pixel included in the edge of the color text.

When the target pixel is a pixel included in the edge of the black text or the color text, the correction processing section 33 performs a filter process for calculating a weighted average of density values of pixels positioned around eight neighboring pixels of the target pixel. FIG. 13 is a view illustrating an example of a filter for calculating the weighted average. By using this filter, it is possible to obtain the weighted average of density values of surrounding pixels exclusive of the target pixel and its eight neighboring pixels, and reduce the difference in density between pixels in the black text segment and the surrounding pixels.

When the target pixel is a pixel that is not included in the edge of the black text or the color text, the correction processing section 33 performs a smoothing process using a smoothing filter. The smoothing process performed herein is a smoothing process that is moderate enough not to cause a halftone moire. FIG. 14 is a view illustrating an example of the smoothing filter. By using this smoothing filter, the smoothing is performed between the target pixel and its eight neighboring pixels. Note that filter coefficients illustrated in FIGS. 13 and 14 are only illustrative, and the filter coefficient is not limited thereto as long as the filter coefficient is set on the basis of the above-described concept.

FIGS. 15A, 15B and FIG. 16 are views illustrating examples of the result of the filter process by the correction processing section 33. FIG. 15A illustrates an example of the image, while FIG. 15B illustrates the result of detection of the edge of the black text from the image illustrated in FIG. 15A. FIG. 16 illustrates the result obtained by performing the filter process and the smoothing process on the image illustrated in FIG. 15A using the filters illustrated in FIGS. 13 and 14. Note that, in these examples, calculation is performed on the assumption that an outside region of the image that is not illustrated satisfies R=G=B=255. Note that, the same processes are performed on the edge of the color text, though not illustrated.

By performing such filter processes, it is possible to reduce the difference in density in the surrounding regions of the edges of the texts (the black and color texts), and suppress an artifact caused by the lossy compression such as ringing noise or the like. In addition, due to the smoothing process, it is possible to suppress the occurrence of the similar artifact and the halftone moire in a region other than the vicinity of the edge, and further contribute to an improvement in compression ratio. The process result illustrated in FIG. 16 corresponds to the background layer. The correction processing section 33 generates the background layer by obtaining the process result illustrated in FIG. 16, and outputs the generated background layer.

Next, processes by the resolution reducing section 35 will be described. Note that the resolution reduction process by the resolution reducing section 35 can be executed when the color image processing apparatus 2 has the compression processing section 3 illustrated in FIG. 2B or FIG. 3B. In addition, the resolution reduction process is performed when the high compression mode is selected in order to further reduce the data amount of the compressed file. That is, when the ultra-fine mode is selected, the resolution reducing section 35 does not perform the resolution reduction process. The resolution reducing section 35 reduces the resolution of the background layer by performing an interpolation process such as simple thinning, nearest neighbor, bilinear, or bicubic process on the background layer generated by the correction processing section 33.

FIG. 17 is a view illustrating an example of the result of the resolution reduction process. The image illustrated in FIG. 17 is the result obtained by reducing the resolution of the background layer illustrated in FIG. 16 to ½ using the bilinear. At this point, as the starting point of the bilinear, the center of 2×2 pixels is used so that the average value of 2×2 pixels (all digits to the right of the decimal point are rounded off) is the result of the bilinear. As illustrated in FIG. 17, the number of pixels in the background layer is decreased, and the data amount is reduced by the resolution reduction. Since a fine shape of the text included in the image can be reproduced using the foreground layer, an effect on the reproducibility of the image is small even when the resolution of the background layer is reduced. Consequently, the size of the compressed file can be reduced without degrading the reproducibility of the image.

Next, processes by the density correction processing sections 36 and 37 will be described. Note that the density correction by the density correction processing sections 36 and 37 can be executed when the color image processing apparatus 2 has the compression processing section 3 illustrated in FIG. 3A or 3B. Since the density of the entire image of the background layer is corrected toward uniformization by the filter process by the correction processing section 33, the resolution reduction process by the resolution reducing section 35, and the lossy compression process by the lossy compressing section 34, the contrast in the background layer is lowered. To cope with this, the density correction for increasing the densities of the pixels in the background layer is performed before the filter process by the correction processing section 33 and before the lossy compression process by the lossy compressing section 34.

Figure 18B:
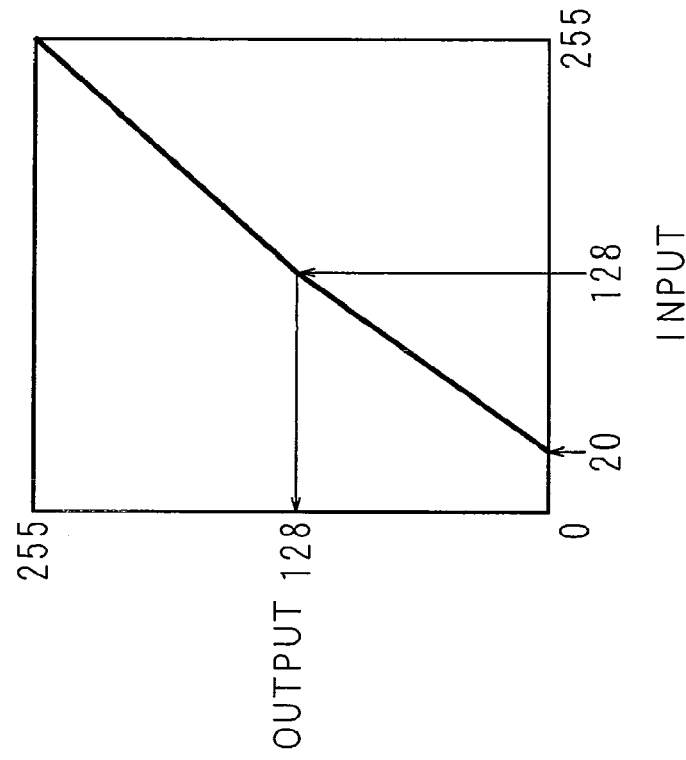
FIGS. 18A and 18B are characteristic views illustrating examples of a lookup table.
Figure 18A:
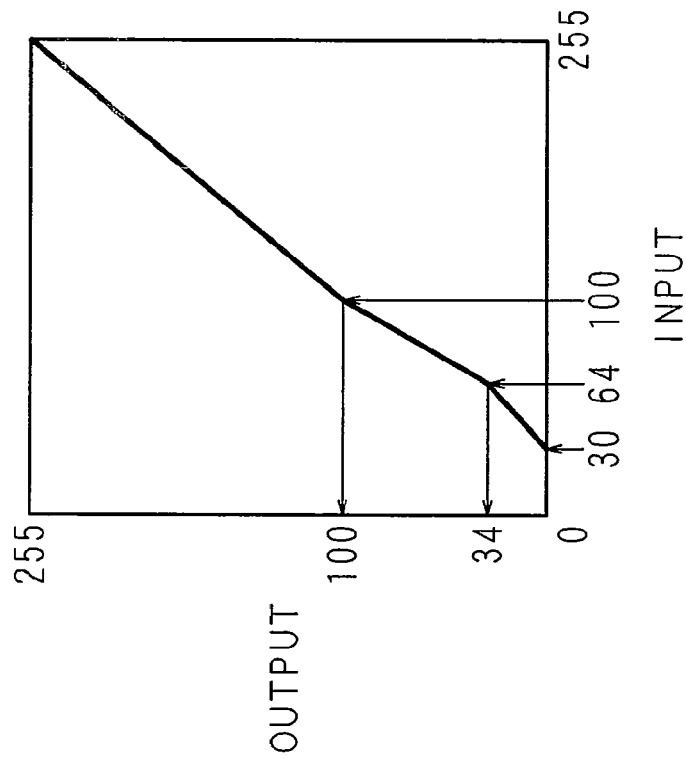

Each of the density correction processing sections 36 and 37 stores a one-dimensional lookup table, and performs a process for converting the density value of each pixel in the background layer using the lookup table. FIGS. 18A and 18B are characteristic views illustrating examples of the lookup table. FIG. 18A illustrates the lookup table used by the density correction processing section 36, while FIG. 18B illustrates the lookup table used by the density correction processing section 37. The horizontal axis in each drawing indicates an input density value, while the vertical axis indicates an output density value.

As illustrated in FIGS. 18A and 18B, the density value of each pixel in the background layer is converted to the output density value in correspondence to the input density value. As illustrated in FIGS. 18A and 18B, each of the lookup tables is set such that the input density value is converted into a value not more than the present density value. As the density value is smaller, the color of the pixel is deeper, and hence the density of the pixel in the background layer is increased. In the example illustrated in FIG. 18A, the input density values of 0 to 30 are converted to the density value of 0, and the input density values of 30 to 64 are converted to density values obtained by subtracting 30 from the input density values. In addition, in the range of the input density value from 64 to 100, the relation between the input and the output is linearly changed such that the output density value=100 is established at the input density value=100. Further, in the range of the input density value from 100 to 255, the conversion is made such that the input=the output is established.

In the example illustrated in FIG. 18B, the input density values of 0 to 20 are converted to the density value of 0 and, in the range of the input density value from 20 to 128, the relation between the input and the output is linearly changed such that the output density value=128 is established at the input density value=128. In addition, the input density values of 128 to 255 are converted such that the input=the output is established. Since the density correction in the density correction processing section 37 is additionally performed before the lossy compression on the background layer having been already subjected to the density correction in the density correction processing section 36, as illustrated in FIG. 18, the degree of an increase in density may be lower than that in the density correction in the density correction processing section 36.

The lookup tables illustrated in FIGS. 18A and 18B are only illustrative, and the lookup table is not limited thereto. Furthermore, the lookup tables used by the density correction processing sections 36 and 37 may be different from each other as illustrated in FIGS. 18A and 18B, or may also be the same. When the lookup tables are the same, the memory capacity required in the compression processing section 3 can be reduced. When the lookup tables are different, it becomes possible to perform finer density adjustment in accordance with a density reduction in each process in the compression processing section 3.

FIGS. 19A and 19B and FIGS. 20A and 20B are views illustrating examples of the results of the density correction processes by the density correction processing sections 36 and 37, and illustrate the process results by the compression processing section 3 having the structure illustrated in FIG. 3B. FIG. 19A illustrates the process result obtained by performing the density correction process on the image illustrated in FIG. 15A in the density correction processing section 36. As illustrated in FIG. 19A, the density value of each pixel is converted to a value indicative of a deeper color (a smaller value) than that of the image illustrated in FIG. 15A by the density correction of the density correction processing section 36. FIG. 19B illustrates the background layer generated by the correction processing section 33 on the basis of the process result illustrated in FIG. 19A. As illustrated in FIG. 19B, the density of the background layer is increased to be higher than that of the background layer illustrated in FIG. 16.

FIG. 20A illustrates the result of the resolution reduction process performed on the background layer illustrated in FIG. 19B in the resolution reducing section 35. Further, FIG. 20B illustrates the process result of the density correction process performed on the background layer illustrated in FIG. 20A in the density correction processing section 37. When compared with the background layer illustrated in FIG. 17, the density value of each pixel is small and the density is increased in the background layer having been subjected to the density correction illustrated in FIG. 20B. As a result, thereafter, even when the lossy compression is performed by the lossy compressing section 34, the contrast can be maintained at a high level. Note that the same processes are performed on the background layer in the case where the two-color text mode is selected, and the same effects are obtained.

By the above-described process in each section in the compression processing section 3, the foreground layer of the black text and the background layer are generated from the image. Therefore, the compression processing section 3 groups the lossless compressed foreground layer of the black text, the lossy compressed background layer, and the decompression information including information that sets the black density of the black text indicated by the black text information as the color of the black pixel included in the foreground layer together into one file to generate the compressed file. With this operation, the color of the black text in the image obtained by decompressing the compressed file can be made to be a color close to black in the background layer, and the gap of the black density between the background layer and the outline of the black text can be suppressed.

In addition, when the two-color text mode is selected, the foreground layer of the color text is generated in addition to the foreground layer of the black text and the background layer. In this case, the compression processing section 3 groups the lossless compressed foreground layer of the black text and foreground layer of the color text, the lossy compressed background layer, and the decompression information together into one file to generate the compressed file. With this operation, in the image obtained by decompressing the compressed file, not only the black text but also a color of the color text of a specific color specified by a user can be made to be a color close to a color in the background layer, and the gap of the density between the background layer and the outlines of the individual texts (the black text and the color text) can be suppressed.

Figure 21C:
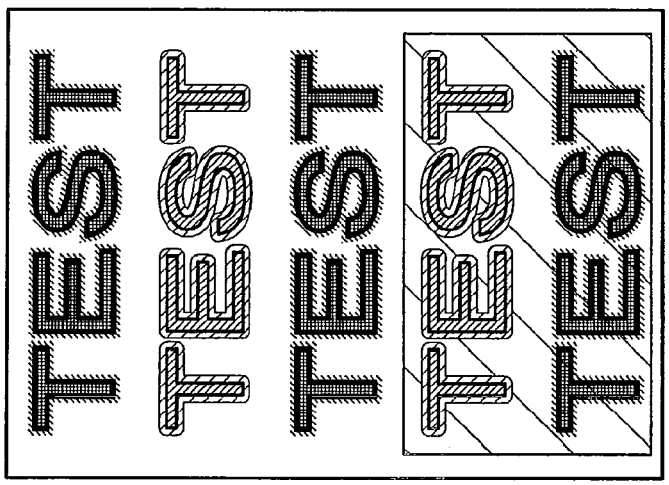
FIGS. 21A to 21C are schematic views illustrating examples of a result of processes by the compression processing section.
Figure 21B:
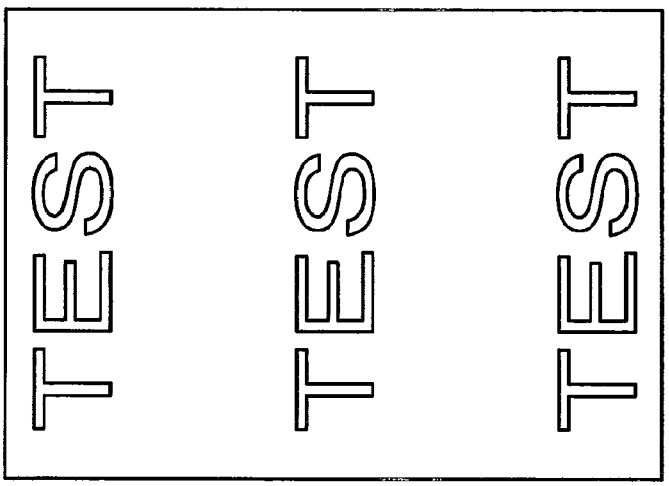
Figure 21A:
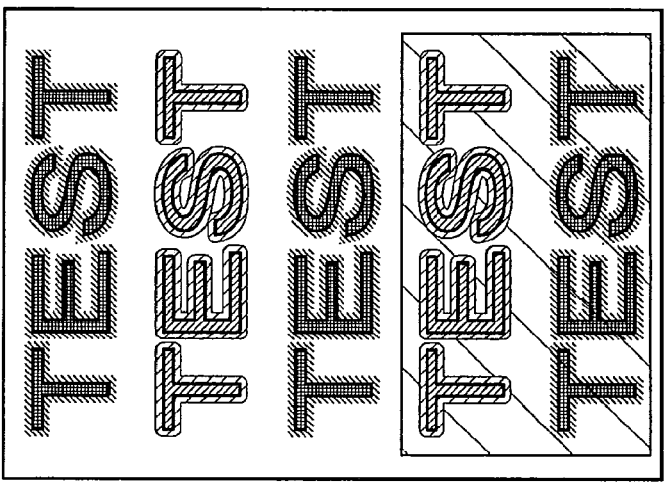

FIGS. 21A to 21C are schematic views illustrating examples of the result of the processes by the compression processing section 3, and illustrate the results of the image processes performed on the image illustrated in FIG. 9. FIG. 21A illustrates the background layer, while FIG. 21B illustrates the foreground layer (the foreground layer including the black text). The background layer is an image substantially identical to the original image, while the foreground layer is a binary image representing the edge of the black text. FIG. 21C illustrates the image obtained by decompressing the compressed file, and is an image in which the foreground layer and the background layer are composited. Although the edge of the black text is enhanced in FIG. 21C, the edge of the black text is actually represented in black having a density close to that of the color of the black text in the background layer so that the gap is not conspicuous. Since the outline of the black text is represented by the lossless compressed foreground layer, the outline is clearly represented and the visibility of the black text is high. In addition, since the difference in density between the black text and the other portion is further reduced, a noise occurring during the lossy compression of the background layer is suppressed and the deterioration in the visibility of the black text is suppressed. With regard to the color text included in the background layer, bleeding is caused by the filter process and the lossy compression process so that the color text is slightly blurred. However, by performing the density correction processes in the density correction processing sections 36 and 37, the visibility thereof can be improved, though the visibility is not as high as that of the black text.

Figure 22A:
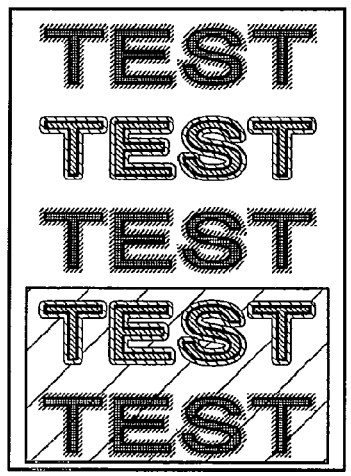
FIGS. 22A to 22D are schematic views illustrating an example of a result of the processes by the compression processing section when a two-color text mode is selected.
Figure 22B:
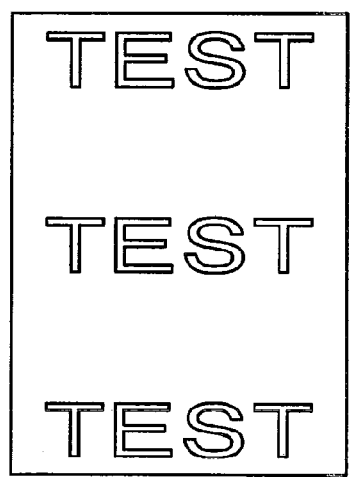
Figure 22C:
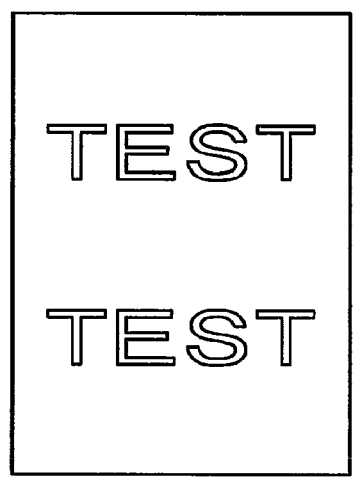
Figure 22D:
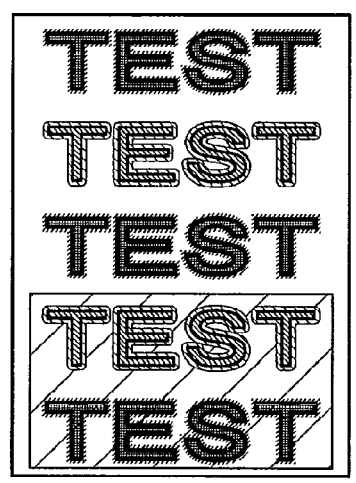

FIGS. 22A to 22D are schematic views illustrating an example of the result of the processes by the compression processing section 3 when the two-color text mode is selected, and illustrate the result of the image processes performed on the image illustrated in FIG. 9. FIG. 22A illustrates the background layer, FIG. 22B illustrates the foreground layer including the black text, FIG. 22C illustrates the foreground layer including the color text, and FIG. 22D illustrates the image obtained by decompressing the compressed file and compositing the foreground layers and the background layer. When the two-color text mode is selected, the compression processing section 3 generates the background layer illustrated in FIG. 22A and the foreground layers illustrated in FIGS. 22B and 22C. Further, by compositing these layers, the image illustrated in FIG. 22D is obtained. Note that, although the edges of the black and color texts are enhanced and drawn in FIG. 22D as well, the edges are actually represented in colors having densities close to those of colors of the background layer so that the gaps are not conspicuous.

The image forming apparatus 1 of Embodiment 1 may also have a configuration in which the image on the basis of the compressed file generated in the compression processing section 3 can be formed in the color image output apparatus 13. In this case, the color image processing apparatus 2 performs a decompression process in a decompression processing section (not illustrated) on the compressed file generated in the compression processing section 3 or the compressed file stored in the storage section 30 to decompress the foreground layer and the background layer and composite the foreground layer and the background layer. The color image processing apparatus 2 performs required image processes on the image data obtained by compositing the foreground layer and the background layer, and outputs the image data to the color image output apparatus 13. The color image output apparatus 13 forms the color image on the basis of the image data.

As described above, in the present invention, when the image including the black text is compressed, the edge of the black text in the image is detected, the foreground layer in which the detected edge is represented by the binary image is generated, the foreground layer is subjected to the lossless compression, the background layer in which the difference in density between the edge of the black text and the other portion in the image is reduced is generated, and the background layer is subjected to the lossy compression. By generating the foreground layer by detecting the edge of the black text instead of the entire text, the black text is not deformed by being incorporated into the background layer and subjected to the lossy compression so that it becomes easy to separate the text from the background. Since the outline of the black text is represented using the lossless compressed foreground layer, the outline is clearly represented and the visibility of the black text in the image obtained by decompressing the compressed file is enhanced. Since the visibility of the black text that is most frequently used in various documents is enhanced, the visibility of the text is high also in the image in which the document is compressed, and the document can be easily reused.

In addition, in the present invention, when a mode for emphasizing the visibility of the color text of another color in addition to the black text (the two-color text mode) is selected by a user, the above-described processes on the black text are performed also on the color text of the specified color. Specifically, by detecting not only the edge of the black text but also the edge of the color text of the specific color to generate the foreground layers, not only the black text but also the color text of the specific color is not deformed by being incorporated into the background layer and subjected to the lossy compression so that it becomes easy to separate the texts from the background. Further, since the outlines of the black text and the color text of the specific color are represented using the lossless compressed foreground layers, the outlines are clearly represented and the visibility of the black text and the color text of the specific color in the image obtained by decompressing the compressed file is enhanced. Therefore, in a document in which not only the black text but also many color texts of the specific color are used, since the visibility of not only the black text but also the color text of the specific color is improved, the visibility of each text can be enhanced also in the image in which the document is compressed.

Additionally, in the present invention, the high compression mode and the ultra-fine mode are provided and, when a user selects the high compression mode, before the background layer is subjected to the lossy compression, the resolution of the background layer is reduced to reduce the data size thereof. On the other hand, when a user selects the ultra-fine mode, the resolution of the background layer is made equal to that of the foreground layer by not reducing the resolution of the background layer, and the visibility of the text remaining in the background layer is thereby improved. Therefore, with this simple method, a user is capable of selecting the execution of the compression process in accordance with whether priority is given to readability of the text included in the background layer or the file size of the compressed file.

Further, in the present invention, in order to reduce the density difference in the image, with regard to pixels included in the edge of the text (the black text or the color text of one color), the filter process for calculating the weighted average of density values of the surrounding pixels is performed, and the edge of the text is thereby dulled in the surrounding region of the text so that the difference in density between the text and the background is reduced. In addition, the density smoothing process is performed on pixels outside the edge of the text, and a change in the density of the region other than the surrounding region of the text is thereby reduced. The reduction in density between the text and the background in the surrounding region of the text allows suppression of the artifact occurring during the lossy compression of the background layer. Furthermore, the reduction in the change of the density in the region other than the surrounding region of the text allows suppression of occurrence of the artifact and moire in the region other than the surrounding region of the text during the lossy compression of the background layer. Thus, since the occurrence of the noise resulting from the image compression can be suppressed, the deterioration in the text in the image obtained by decompressing the compressed file can be suppressed.

Embodiment 2

A description will be given hereinafter of Embodiment 2 that describes an image reading apparatus of the present invention. In Embodiment 1 described above, while the description has been given of the configuration in which the image compressing apparatus of the present invention serves as a part of the image forming apparatus 1, in Embodiment 2, a description will be given of a configuration in which the image compressing apparatus of the present invention serves as a part of the image reading apparatus. The image reading apparatus of Embodiment 2 is, e.g., a flatbed scanner.

Figure 23:
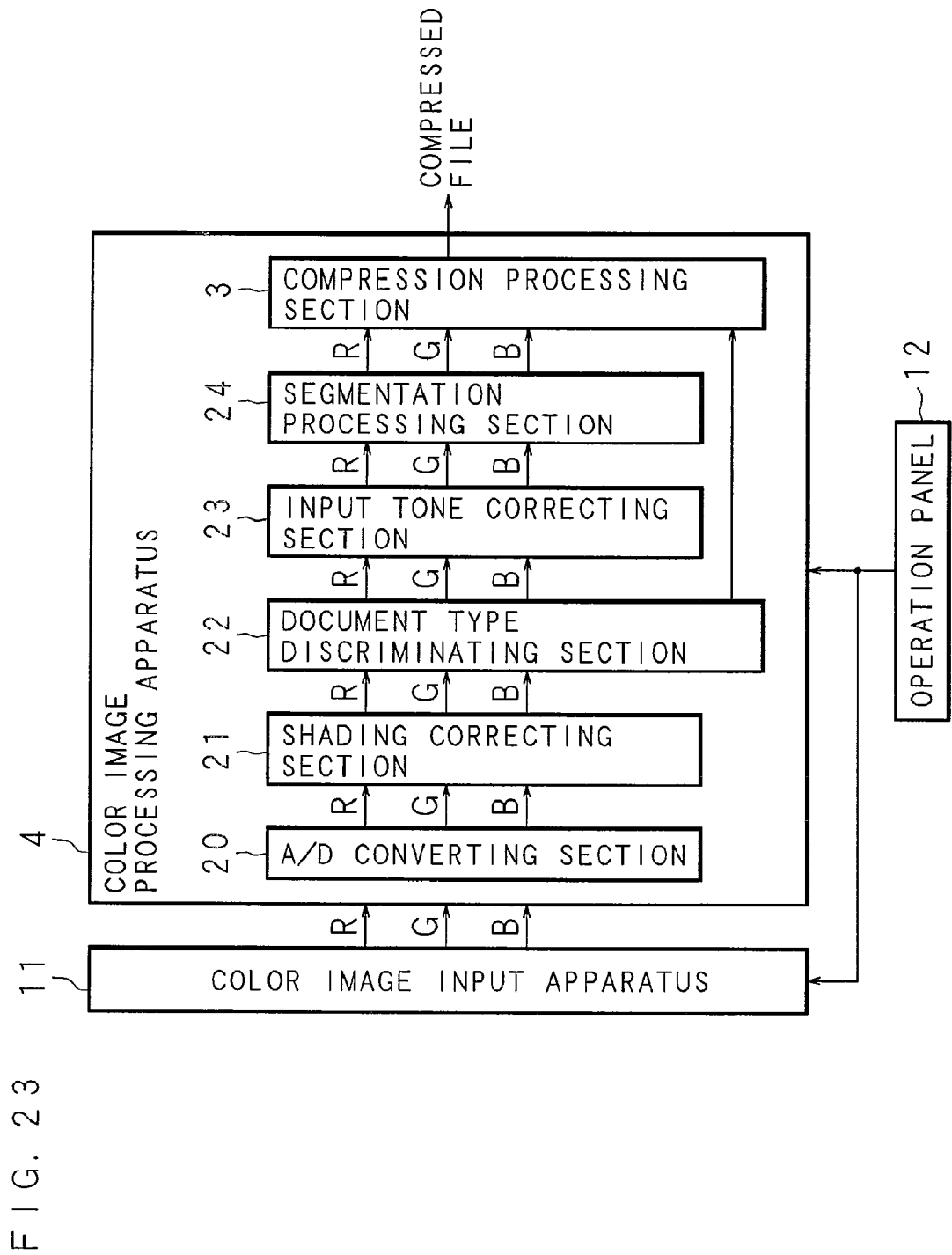
FIG. 23 is a block diagram illustrating functions of an image reading apparatus of Embodiment 2.

FIG. 23 is a block diagram illustrating functions of the image reading apparatus of Embodiment 2. The image reading apparatus includes the color image input apparatus 11 for optically reading the color image, and a color image processing apparatus 4 is connected to the color image input apparatus 11. To the color image processing apparatus 4, a host apparatus (not illustrated) such as a personal computer (PC) or the like is connected via the communication cable or the communication network. To the color image input apparatus 11 and the color image processing apparatus 4, the operation panel 12 is connected. The color image input apparatus 11 performs the same processes as in Embodiment 1, and outputs RGB analog signals obtained by reading the color image to the color image processing apparatus 4.

The color image processing apparatus 4 includes the A/D converting section 20, the shading correcting section 21, the document type discriminating section 22, the input tone correcting section 23, the segmentation processing section 24, and the compression processing section 3. The color image processing apparatus 4 has a configuration in which the analog signals inputted from the color image input apparatus 11 are converted into digital signals in the A/D converting section 20, and the digital signals are sent to the shading correcting section 21, the document type discriminating section 22, the input tone correcting section 23, the segmentation processing section 24, and the compression processing section 3 in this order. The compression processing section 3 corresponds to the image compressing apparatus according to the present invention. The respective configurations of the A/D converting section 20, the shading correcting section 21, the document type discriminating section 22, and the input tone correcting section 23 are the same as those in Embodiment 1. The segmentation processing section 24 outputs the RGB signals inputted from the input tone correcting section 23 to the compression processing section 3.

The configuration of the compression processing section 3 is the same as in Embodiment 1, and the compression processing section 3 acquires the RGB signals (the image data) from the segmentation processing section 24 and executes the image compressing method of the present invention in the same manner as in Embodiment 1 to generate the compressed file in which the inputted image data is compressed. In addition, the compression processing section 3 outputs the generated compressed file to the host apparatus (not illustrated). The host apparatus receives the compressed file outputted by the color image processing apparatus 4, and executes a process such as storage of the compressed file, transmission of the compressed file to the outside, or output of an image on the basis of the compressed file. Note that the image reading apparatus of the present invention can be applied to not only scanners but also digital cameras.

Also in Embodiment 2 described above, similarly to Embodiment 1, when the image including the black text is compressed, by detecting the edge of the black text to generate the foreground layer, and reducing the difference in density between the edge of the black text and the other portion in the image to generate the background layer, the visibility of the black text in the image obtained by decompressing the compressed file can be improved. In addition, when the two-color text mode is selected, by detecting the respective edges of the black text and the color text of the specified color to generate the foreground layers, and reducing the difference in density between the edges of the black text and the color text of the specific color, and the other portion in the image to generate the background layer, the visibility of the black text and the color text of the specific color in the image obtained by decompressing the compressed file can be improved. Consequently, in the image reading apparatus of Embodiment 2, it becomes possible to generate the compressed file in which the visibility of the text when the image is reproduced is improved while reducing the size of the compressed file.

Embodiment 3

Each of various apparatuses to which the image compressing apparatus of the present invention is applied can be constituted such that various conditions in the compression process performed by the image compressing apparatus can be selected by a user. For example, it is possible to select from among a process for generating the compressed file in which the visibility of the black text is improved (the black text emphasis mode), a process for generating the compressed file in which the visibility of the black text and the color text of the specific color is improved (the two-color text mode), a process for generating the compressed file using the normal high compression method (the high compression mode), and a process for generating the compressed file in which the visibility of the text included in the background layer is also maintained (the ultra-fine mode). In Embodiment 3, the operation panel 12 provided in the above-described image forming apparatus 1 of Embodiment 1 and the above-described image reading apparatus of Embodiment 2 will be described in detail. Each of various apparatuses to which the image compressing apparatus of the present invention is applied receives selection instructions from a user via the operation panel 12 to thereby set various conditions during the time of generation of the compressed file.

FIGS. 24A and 24B, and FIGS. 25A and 25B are schematic views illustrating examples of display of the operation panel 12. In FIGS. 24A and 24B, and FIGS. 25A and 25B, examples of the display for setting various conditions during the time of generation of the compressed file are illustrated. When the image forming apparatus 1 of Embodiment 1 and the image reading apparatus of Embodiment 2 (hereinafter, only the image forming apparatus 1 will be described as a representative) wait for an instruction for executing a process for reading a document, the operation panel 12 displays a setting screen illustrated in FIG. 24A on the display section, and operations from a user are received in the operation section.

Figure 24A:
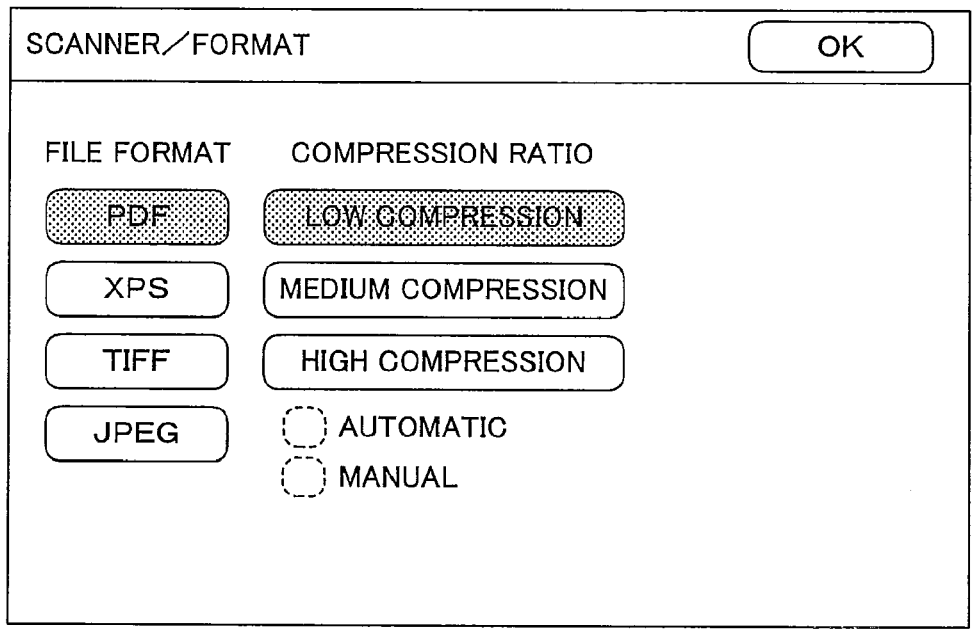
FIGS. 24A and 24B are schematic views illustrating examples of display of an operation panel.

As illustrated in FIG. 24A, the operation panel 12 has a configuration in which the file format of the compressed file to be generated can be selected from among, e.g., four types of PDF, XPS, TIFF (Tagged Image File Format), and JPEG. Note that the file format is not limited thereto, and there can be applied any file format that allows separation of image data into a plurality of layers each having transparent information, compression of each of the layers using an appropriate method, and composition of the compressed image data items into one file. In addition, the number of types that can be selected is not limited to four. FIG. 24A illustrates a state where PDF is selected. In addition, as illustrated in FIG. 24A, the operation panel 12 has a configuration in which the compression ratio during the time of generation of the compressed file can be selected from among three types of low compression, medium compression, and high compression. FIG. 24A illustrates a state where low compression is selected.

When a user wants to generate the compressed file using the image compressing method of the present invention, in the setting screen displayed in the operation panel 12, the user selects "PDF" or "XPS" as the file format. At this point, in a case where a document to be processed is a document having few texts such as a photograph, the user selects "high compression (the high compression mode)" as the compression ratio. When the high compression mode is selected, the execution of the normal high compression process is set. With this operation, the image forming apparatus 1 performs the normal high compression process on the image data read from the document to generate the compressed file having a small file size.

Figure 24B:
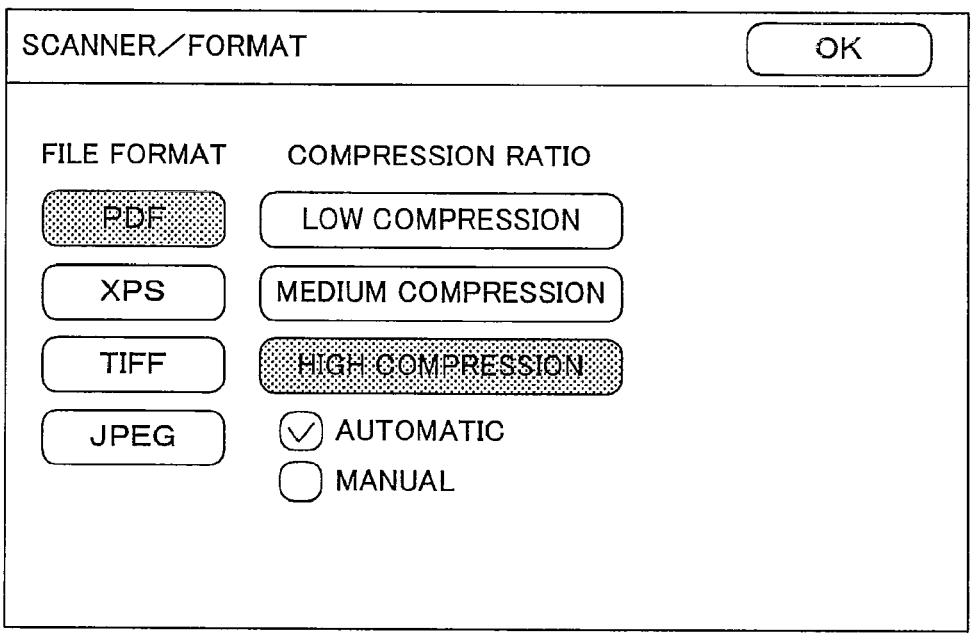

FIG. 24B illustrates a state where "high compression" is selected as the compression ratio and, when "high compression" is selected, checkboxes of "automatic" and "manual" further become selectable in the operation panel 12. Note that, since the image compressing method of the present invention can not be used when the compressed file in TIFF or JPEG is to be generated, when "TIFF" or "JPEG" is selected as the file format, a configuration is adopted in which "low compression", "medium compression", or "high compression" can be selected but "automatic" or "manual" can not be selected.

FIG. 24B illustrates a state where the checkbox of "automatic" is selected. When "automatic" is selected, the image forming apparatus 1 (the color image processing apparatus 2) calculates the number of pixels of the black text or the color text in the document on the basis of the image data read from the document, and automatically switches among the black text emphasis mode, the two-color text mode, the black text emphasis•ultra-fine mode, and the two-color text•ultra-fine mode on the basis of the calculation result. With this operation, the optimum compression process is executed in accordance with the amounts of the black text and the color text in the document, and the optimum compressed file is generated.

Figure 25A:
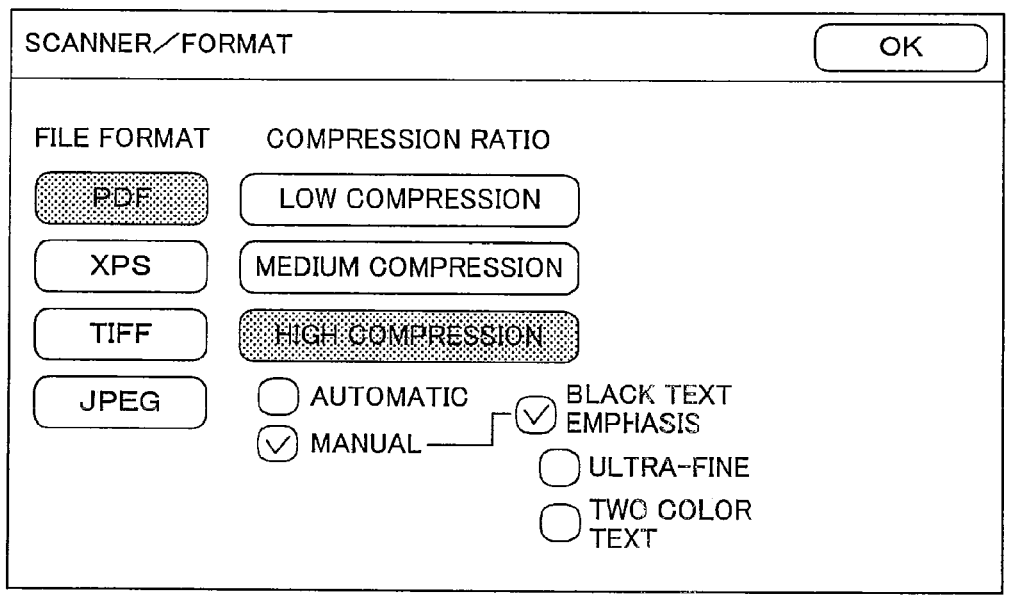
FIGS. 25A and 25B are schematic views illustrating examples of display of the operation panel.

FIG. 25A illustrates a state where the checkbox of "manual" is selected and, when "manual" is selected, a checkbox of "black text emphasis (the black text emphasis mode)" further becomes selectable in the operation panel 12. Note that, when the checkbox of "manual" is selected, the checkbox of "black text emphasis" is automatically marked. When the black text emphasis mode is selected, the execution of the process for generating the compressed file having a small file size in which the visibility of the black text is improved is set. That is, the image forming apparatus 1 executes the compression process in accordance with the image compressing method of the present invention.

In the setting screen in a state illustrated in FIG. 25A, checkboxes of "ultra-fine (the ultra-fine mode)" and "two-color text (the two-color text mode)" are further selectable. When the visibility of not only the black text but also the color text (a text of a color other than black) is improved, the user selects the ultra-fine mode. When the ultra-fine mode is selected, the execution of the process for generating the compressed file in which the visibility of the color text is also improved is set, though the file size thereof is slightly increased. Note that the ultra-fine mode becomes selectable only when the black text emphasis mode is selected. In FIG. 25A, (1) the black text emphasis mode, (2) the two-color text mode (the checkboxes of "black text emphasis" and "two-color text" are marked), (3) the black text emphasis•ultra-fine mode, and (4) the two-color text•ultra-fine mode are selectable. In the foregoing, while the checkbox of "black text emphasis" is marked when the two-color text mode is selected, only the checkbox of "two-color text" may also be marked. For example, in the case of the two-color text•ultra-fine mode, the checkboxes of "ultra-fine" and "two-color text" are marked.

Note that, when the setting operation via the setting screen can be performed after the document is scanned in advance, the number of pixels of the color text in the document is calculated in advance on the basis of the read image data and, only when the number of pixels of the color text is not less than a predetermined number (for example, not less than 30000 pixels, the number of pixels corresponding to not less than 0.5% with respect to the document size), the checkbox of "ultra-fine" may be enabled (the ultra-fine mode may be made selectable).

Figure 25B:
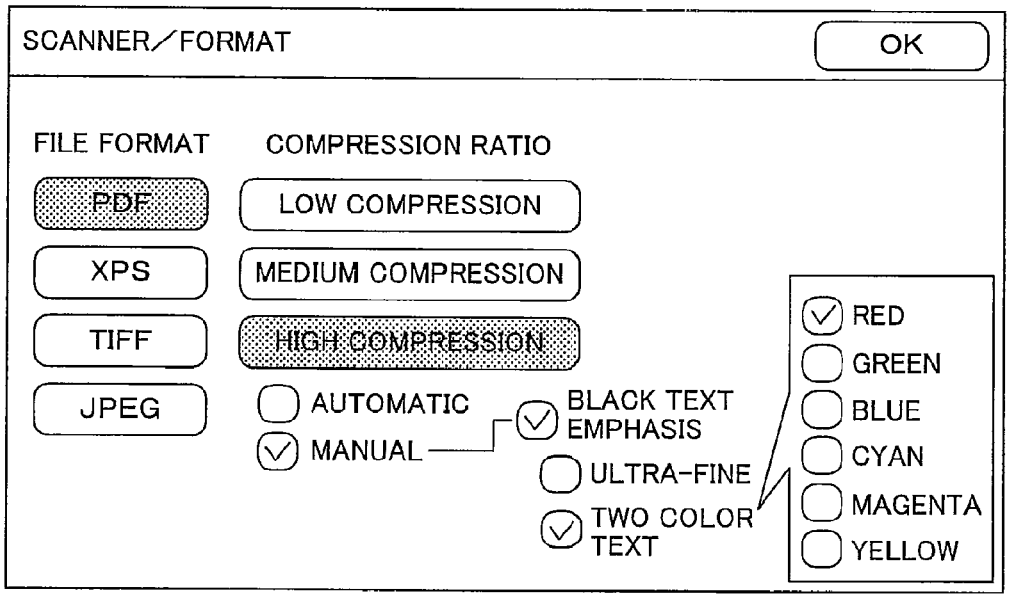

FIG. 25B illustrates a state where the checkbox of "two-color text" is selected and, when "two-color text" is selected, the operation panel 12 has a configuration in which, in addition to black, another color (the representative color) can be selected from among red, green, blue, cyan, magenta, and yellow. Although the presentation of the color text other than that of the black text is limited to only one color, when the user wants to maintain the present file size while improving the visibility, the user selects the two-color text mode. Specifically, the user selects "high compression" as the compression ratio and selects the checkbox of "manual", and then selects the checkbox of "two-color text".

Further, the user selects one representative color from the six colors. FIG. 25B illustrates a state where red is selected as the representative color. With this operation, the execution of the process for generating the compressed file having a small file size in which the visibility of the black text and the color text represented by the black text and the color text of the selected representative color is improved is set. Note that the two-color text mode becomes selectable only when the black text emphasis mode is selected, and can be used in combination with the ultra-fine mode.

Note that, when the setting operation via the setting screen can be performed after the document is scanned in advance, the number of colors of the color text in the document is counted in advance on the basis of the read image data and, when the number of colors is not more than a specific number (for example, not more than two colors), the two-color text mode may be made selectable. In addition, the number of pixels for each color of the color text in the document is counted in advance and, when the number of pixels is not more than a specific number (for example, not more than 24000 pixels, not more than 0.4% with respect to the document size), the two-color text mode may be made selectable.

In addition, when the resolution of not more than 300×300 DPI is specified as the resolution at the time of reading of the document by using a user interface (not illustrated), it can be predicted that the user wants to acquire the compressed file having a file size reduced as much as possible. Further, when the resolution of 400×400 DPI, 600×600 DPI, or the like is specified as the resolution at the time of reading of the document, it can be predicted that the user wants to acquire the compressed file that is as faithful as possible to the document. Consequently, in the case where the resolution of not more than 300×300 DPI is specified, when the compression ratio of "high compression" is selected via the setting screens illustrated in FIGS. 24A and 24B, the checkboxes of "automatic" and "manual" displayed below "high compression" may be enabled. Further, in the case where the resolution of 400×400 DPI, 600×600 DPI, or the like is specified, even when the compression ratio of "high compression" is selected, the checkboxes of "automatic" and "manual" displayed below "high compression" may be disabled (may be made unselectable).

Figure 26:
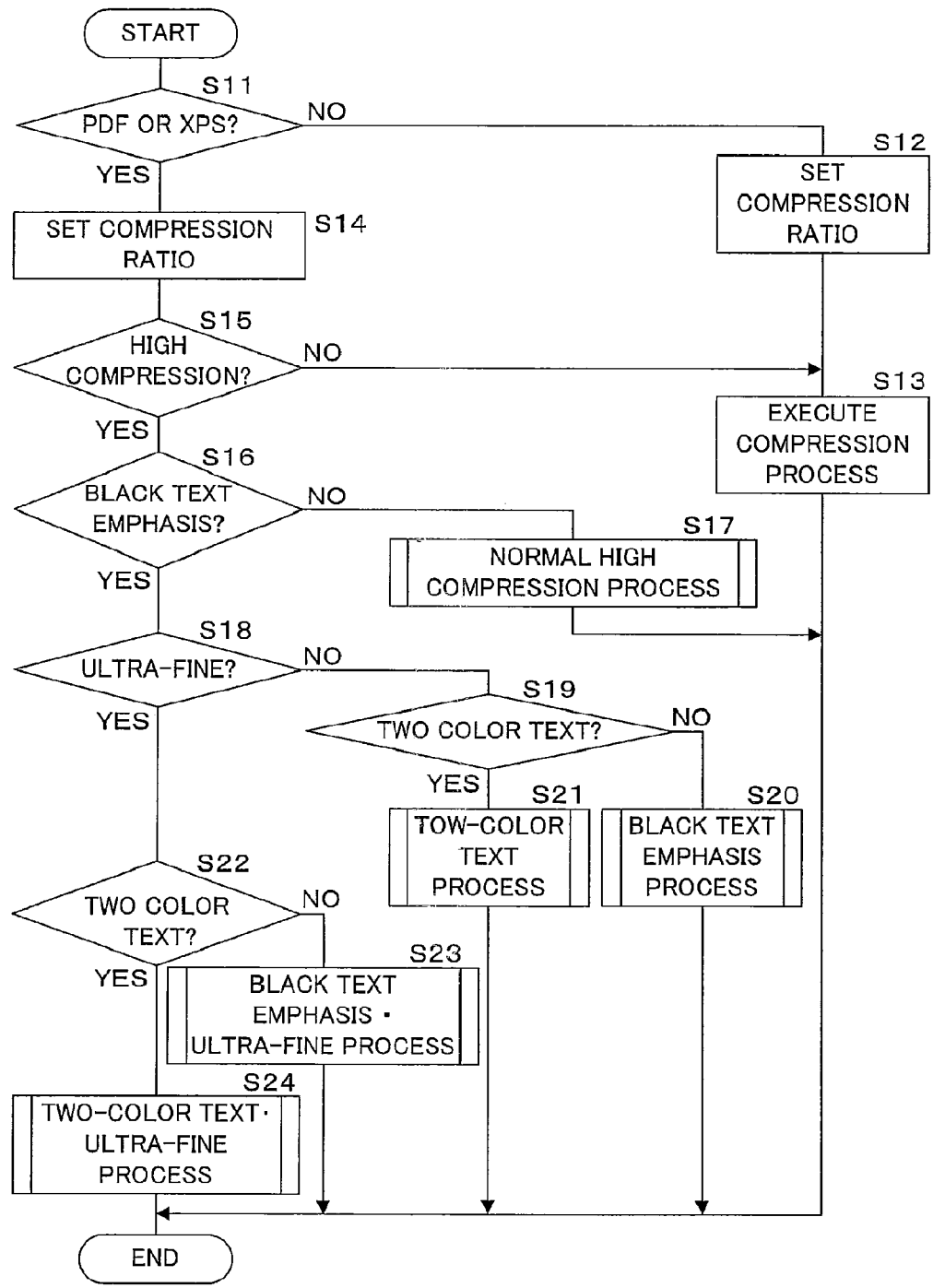
FIG. 26 is a flowchart illustrating procedures in processes performed by the color image processing apparatus.

A description will be given hereinafter of processes performed by the image forming apparatus 1 (the color image processing apparatus 2) having the operation panel 12 allowing the above-described setting screen to be displayed. FIG. 26 is a flowchart illustrating procedures in processes performed by the color image processing apparatus 2. Note that hereinafter the color image processing apparatus 2 is referred to as a "processing section".

The processing section receives various conditions when the image data read from the document by the color image input apparatus 11 is compressed via the setting screen (the operation panel 12) illustrated in each of FIGS. 24A and 24B, and FIGS. 25A and 25B. When performing the compression process, the processing section determines whether or not PDF or XPD is selected as the file format of the compressed file to be generated (S11). When determining that PDF or XPS is not selected (S11: NO), e.g., when TIFF or JPEG is selected, the processing section sets the compression ratio received via the setting screen (S12). The setting screen illustrated in each of FIGS. 24A and 24B, and FIGS. 25A and 25B has a configuration in which one of items of "low compression", "medium compression", and "high compression" is selected as the compression ratio, and the processing section sets the compression ratio pre-associated with the selected item.

The processing section executes the compression process at the set compression ratio (S13), and ends the processes. Specifically, the processing section performs the compression process in the lossless compressing section 32 or the lossy compressing section 34 of the compression processing section 3 to generate a TIFF file or a JPEG file. With this operation, it is possible to generate the compressed file compressed at the compression ratio desired by the user and having the file format desired by the user.

When determining that PDF or XPS is selected (S11: YES), the processing section sets the compression ratio received via the setting screen (S14). The processing section determines whether or not the set compression ratio is a compression ratio associated with "high compression" (S15) and, when determining that the set compression ratio is not the compression ratio associated with "high compression" (S15: NO), the processing section executes the compression process at the compression ratio set in the step S14 (S13), and ends the processes. Herein, the processing section also performs the compression process in the lossless compressing section 32 or the lossy compressing section 34 of the compression processing section 3 to generate a PDF file or a XPS file.

When determining that the set compression ratio is the compression ratio associated with "high compression" (S15: YES), the processing section determines whether or not the black text emphasis mode is selected via the setting screen (S16). When determining that the black text emphasis mode is not selected (S16: NO), e.g., when "automatic" or "manual", which become selectable in the case where "high compression" is selected on the setting screen, can not be selected, the processing section executes a normal high compression process (S17), and ends the present processes. Note that the detail of the normal high compression process will be described later.

When determining that the black text emphasis mode is selected (S16: YES), the processing section determines whether or not the ultra-fine mode is selected (S18) and, when determining that the ultra-fine mode is not selected (S18: NO), the processing section determines whether or not the two-color text mode is selected (S19). When determining that the two-color text mode is not selected (S19: NO), the processing section determines that the normal black text emphasis mode is set, executes a compression process that emphasizes the visibility of the black text (hereinafter referred to as a black text emphasis process) (S20), and ends the present processes. Note that the detail of the black text emphasis process will be described later.

When determining that the two-color text mode is selected (S19: YES), the processing section executes a compression process that emphasizes the visibility of texts of two colors including black (hereinafter referred to as a two-color text process) (S21), and ends the present processes. Note that the detail of the two-color text process will be described later.

When determining that the ultra-fine mode is selected (S18: YES), the processing section determines whether or not the two-color text mode is selected (S22). When determining that the two-color text mode is not selected (S22: NO), the processing section executes a compression process that maintains the visibility of the text included in a region other than the black text (the background layer) while emphasizing the visibility of the black text (hereinafter referred to as a black text emphasis•ultra-fine process) (S23), and ends the present processes. Note that the detail of the black text emphasis•ultra-fine process will be described later. When determining that the two-color text mode is selected (S22: YES), the processing section executes a compression process that maintains the visibility of the text included in a region other than texts of two colors (the background layer) while emphasizing the visibility of the texts of two colors including black (hereinafter referred to as a two-color text•ultra-fine process) (S24), and ends the present processes. Note that the detail of the two-color text•ultra-fine process will be described later.

As described above, the color image processing apparatus 2 of Embodiment 3 is capable of switching among a plurality of modes (the compression processes) in accordance with whether the visibility of the black text is emphasized, the visibility of the texts of two colors is emphasized, or the visibility of the text included in the region other than the black text or the texts of two colors is also emphasized. Therefore, by employing the image compressing method of the present application, the number of selections of a user can be increased when a highly compressed file is generated.

Note that the processes illustrated in FIG. 26 are examples when the user manually selects the desired mode via the setting screen, and a description will be given hereinbelow of processes when the user selects "high compression" as the compression ratio, and further selects "automatic" (an automatic mode) via the setting screen. When the automatic mode is selected, the processing section counts the number of pixels of each of the black text and the color text in the image on the basis of the image data read from the document by the color image input apparatus 11 and, in accordance with the result of the counting, automatically switches among the black text emphasis mode, the two-color text mode, the black text emphasis•ultra-fine mode, and the two-color text•ultra-fine mode. With this operation, it becomes possible to perform the compression process in the optimum mode in accordance with the amounts of the black text and the color text in the document, and provide the optimum compressed file.

Specifically, the processing section (the binary data generating section 31 of the compression processing section 3) determines whether each pixel in the document is a pixel included in the black text segment or the color text segment on the basis of the segmentation class signal outputted from the segmentation processing section 24, and counts the number of pixels included in the black text segment (black pixels) and the number of pixels included in the color text segment (color pixels). Note that, when the color image processing apparatus 2 is operated at the setting in which the segmentation circuit (the segmentation processing section 24) is not used, or when the color image processing apparatus 2 does not have the segmentation circuit, the processing section performs the process for detecting the edge of the text and the process for judging the black pixel or the color pixel, and counts the number of black pixels and the number of color pixels.

In addition, with regard to pixels in the color text, the processing section classifies the color into six colors (red: only R has a large value, green: only G has a large value, blue: only B has a large value, cyan: G and B have large values, magenta: R and B have large values, yellow: R and G have large values), and counts the number of colors present in the document. Note that, an example of the color classifying method, there can be used a method in which the maximum and minimum values in RGB values (an R value, a G value, a B value) of each pixel are determined, it is judged whether the value of the remaining one color is closer to the maximum value or the minimum value, and the color is classified on the basis of the judgment result. For example, in the case of a pixel satisfying R=30, G=100, and B=120, the maximum value is the B value of 120, the minimum value is the R value of 30, and the remaining G value (100) is closer to the B value. Accordingly, the G value and the B value are larger than the R value, and hence it can be judged that the pixel is cyan.

Subsequently, for example, when the counted number of black pixels is not less than a predetermined threshold value, the processing section selects the black text emphasis mode. On the other hand, when the counted number of black pixels is less than the predetermined threshold value, the processing section selects the high compression mode (the mode for performing the normal high compression process). In addition, when the counted number of black pixels and the counted number of color pixels are not less than respective predetermined threshold values, and the counted number of colors is more than a predetermined threshold value, the processing section selects the black text emphasis•ultra-fine mode. Further, when the counted number of black pixels and the counted number of color pixels are not less than the respective predetermined threshold values, and the counted number of colors is not more than the predetermined threshold value, the processing section selects the two-color text mode. Furthermore, when the counted number of black pixels and the counted number of color pixels are not less than the respective predetermined threshold values, the counted number of colors is more than the predetermined threshold value, and pixels are unequally distributed to one of the colors, the processing section selects the two-color text•ultra-fine mode. Note that, when the counted number of black pixels is not less than the predetermined threshold value, and the counted number of color pixels is less than the predetermined threshold value, the processing section selects the black text emphasis mode irrespective of the counted number of colors.

With the processes described above, for example, in a case where the threshold value for the pixel for the black text (the black pixel) is set to satisfy TH3=100, the threshold value for the pixel for the color text (the color pixel) is set to satisfy TH4=500, and the threshold value for the number of colors is set to satisfy TH5=2, when the number of black pixels is 5000, the number of color pixels is 1000, and the number of colors is 2, since the number of black pixels is not less than TH3, the number of color pixels is not less than TH4, and the number of colors is not more than TH5, the processing section determines that both of the number of black text pixels (the black pixels) and the number of color text pixels (the color pixels) are large, and the number of colors is small, and selects the two-color text mode.

In addition, when the number of black pixels is 5000, the number of color pixels is 2000, the number of colors is 5, and pixels are substantially equally distributed to the five colors, since the number of black pixels is not less than TH3, the number of color pixels is not less than TH4, but the number of colors is more than TH5 and pixels are substantially equally distributed to the individual colors, the processing section determines that the numbers of black text pixels and color text pixels are large, and the number of colors is also large, and selects the black text emphasis•ultra-fine mode. Further, when the number of black pixels is 5000, the number of color pixels is 100, and the number of colors is 5, since the number of black pixels is not less than TH3, but the number of color pixels is less than TH4 and the number of colors is more than TH5, the processing section selects the black text emphasis mode irrespective of the number of colors because the number of black text pixels is large but the number of color text pixels is small. Note that the criteria and the threshold values used when each mode is selected are not limited to these examples.

The processing section switches among the compression processes in accordance with the selected mode. Specifically, when the black text emphasis mode is selected, the procession section executes the black text emphasis process, when the two-color text mode is selected, the processing section executes the two-color text process, when the black text emphasis•ultra-fine mode is selected, the processing section executes the black text emphasis•ultra-fine process, when the two-color text•ultra-fine mode is selected, the processing section executes the two-color text•ultra-fine process, and, when the high compression mode is selected, the processing section executes the normal high compression process.

Figure 27:
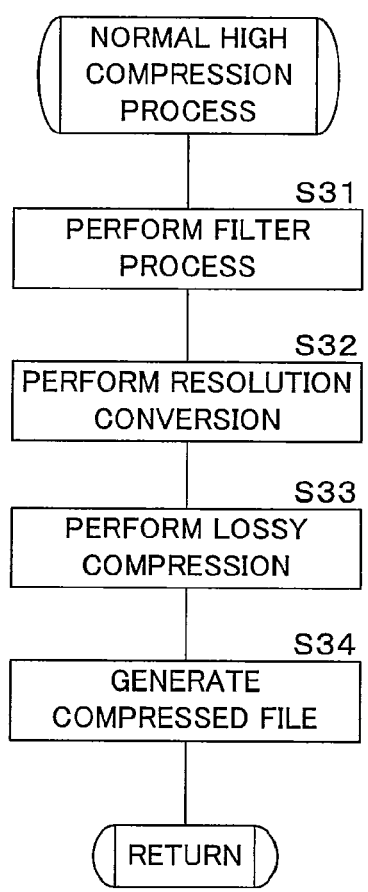
FIG. 27 is a flowchart illustrating procedures in a normal high compression process.

Next, the normal high compression process will be described. FIG. 27 is a flowchart illustrating procedures in the normal high compression process. Note that the processing section in this process is assumed to have a structure in which the compression processing section 3 illustrated in FIG. 2B is provided. When the normal high compression process is performed, the processing section performs the predetermined filter process (e.g., the smoothing process) on the image data (the RGB signals) outputted from the segmentation processing section 24 using the correction processing section 33 of the compression processing section 3 (S31), and performs the resolution conversion to the low-resolution image on the image data using the resolution reducing section 35 (S32). In addition, the processing section performs the lossy compression process on the image data of which the resolution has been reduced using the lossy compressing section 34 (S33) to generate the compressed file (S34), and returns to the processes illustrated in FIG. 26. With this operation, there is generated the compressed file compressed at a high compression ratio and having a small file size.

Figure 28:
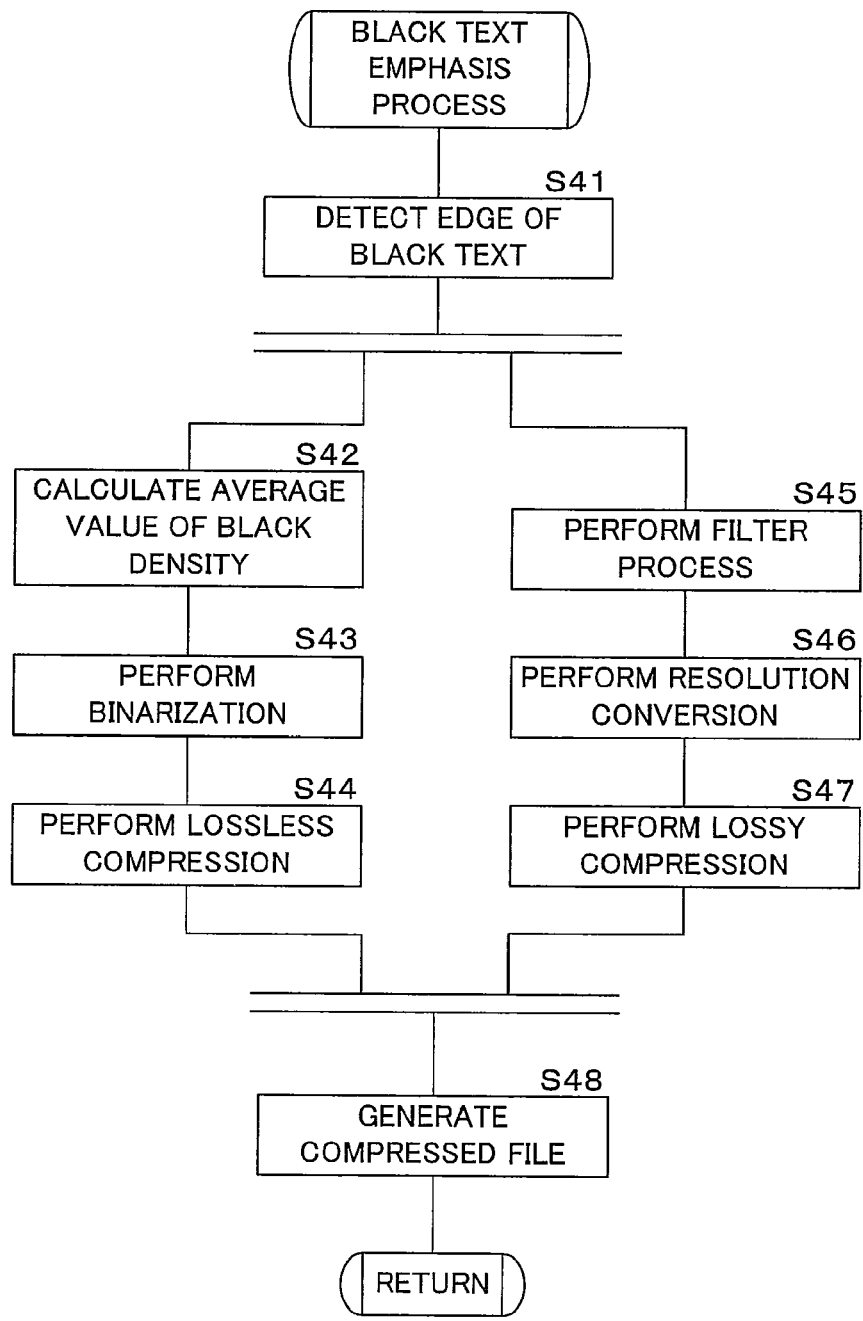
FIG. 28 is a flowchart illustrating procedures in a black text emphasis process.

Subsequently, the black text emphasis process will be described. FIG. 28 is a flowchart illustrating procedures in the black text emphasis process. Note that the processing section in this process is assumed to have a structure in which the compression processing section 3 illustrated in FIG. 2B is provided. When the black text emphasis process is performed, the processing section detects the edge of the black text included in the image on the basis of the image data outputted from the segmentation processing section 24 using the binary data generating section 31 of the compression processing section 3 (S41). Note that the process at the time of detection of the edge of the black text is the same as the process described in Embodiment 1 so that the description thereof will be omitted.

After the detection of the edge of the black text, the processing section executes processes in steps S42 to S44 and processes in steps S45 to S47 in parallel. In the step S42, the processing section calculates the average value of black densities in pixels detected as the edge of the black text using the binary data generating section 31 (S42). Specifically, the processing section calculates the sum of density values in pixels detected as the edge of the black text, counts the number of pixels in the edge of the black text, and divides the sum of density values by the number of pixels. In addition, the processing section performs the binarization process by the method in which density values of pixels in correspondence to the detected edge of the black text are set to 1 and density values of the other pixels are set to 0, or the like using the binary data generating section 31 (S43) to generate the foreground layer. Then, the processing section performs the lossless compression process on the generated foreground layer using the lossless compressing section 32 (S44).

On the other hand, in the step S45, the processing section performs the filter process on pixels detected as the edge of the black text (the foreground layer) such that the difference in density between the pixels and pixels in the vicinity of the edge is reduced and, at the same time, performs the density smoothing process on pixels other than pixels in correspondence to the foreground layer using the correction processing section 33 of the compression processing section 3 (S45). Further, the processing section performs the resolution conversion to the low-resolution image on the image data having been subjected to the processes using the resolution reducing section 35 (S46) to generate the background layer. Subsequently, the processing section performs the lossy compression process on the image data of which the resolution has been reduced using the lossy compressing section 34 (S47). The processing section groups the lossless compressed foreground layer, the lossy compressed background layer, and the decompression information such as the IC table or the like together into one file to generate the compressed file (S48), and returns to the processes illustrated in FIG. 26. With this operation, there is generated the compressed file having a small file size in which the visibility of the black text is maintained.

Figure 29:
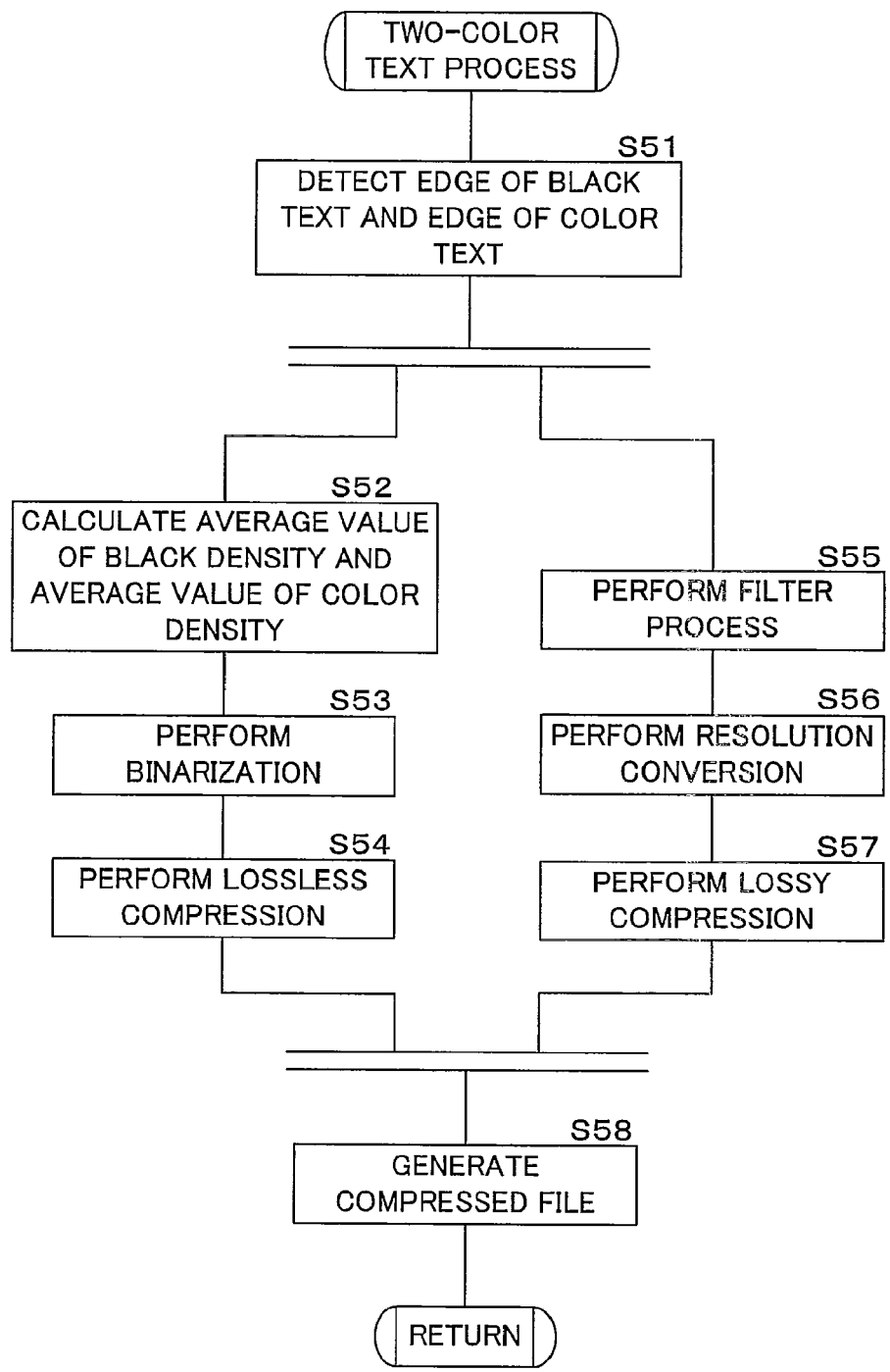
FIG. 29 is a flowchart illustrating procedures in a two-color text process.

Next, the two-color text process will be described. FIG. 29 is a flowchart illustrating procedures in the two-color text process. Note that the processing section in this process is assumed to have a structure in which the compression processing section 3 illustrated in FIG. 2B is provided. When the two-color text process is performed, the processing section detects the edge of the black text and the edge of the color text of one color specified by a user which are included in the image on the basis of the image data outputted from the segmentation processing section 24 using the binary data generating section 31 of the compression processing section 3 (S51). Note that the process at the time of detection of the edges of the black text and the color text of the specific color is the same as the process described in Embodiment 1 so that the description thereof will be omitted.

After the detection of the edges of the black text and the color text of the specific color, the processing section performs processes in steps S52 to S54 and processes in steps S55 to S57 in parallel. In the step S52, the processing section calculates the average value of black densities in pixels detected as the edge of the black text, and the average value of color densities in pixels detected as the edge of the color text of the specific color using the binary data generating section 31 (S52). Specifically, the processing section calculates the sums of density values of pixels detected as the text edges for the black text and the color text of the specific color, counts the numbers of pixels of the text edges, and divides the sums of density values by the numbers of pixels. In addition, the processing section performs the binarization process by the method in which density values of pixels in correspondence to the detected edges of the texts are set to 1 and density values of the other pixels are set to 0, or the like using the binary data generating section 31 (S53) to generate the foreground layers of the black text and the color text of the specific color. Then, the processing section performs the lossless compression process on the generated respective foreground layers using the lossless compressing section 32 (S54).

On the other hand, in the step S55, the processing section performs the filter process on pixels detected as the edge of the black text or the color text of the specific color (the foreground layer) such that the difference in density between the pixels and pixels in the vicinity of the edge is reduced and, at the same time, performs the density smoothing process on pixels other than pixels in correspondence to the foreground layer using the correction processing section 33 of the compression processing section 3 (S55). In addition, the processing section performs the resolution conversion to the low-resolution image on the image data having been subjected to the processes using the resolution reducing section 35 (S56) to generate the background layer. Then, the processing section performs the lossy compression process on the image data of which the resolution has been reduced using the lossy compressing section 34 (S57). The processing section groups the lossless compressed foreground layer, the lossy compressed background layer, and the decompression information such as the IC table or the like together into one file to generate the compressed file (S58), and returns to the processes illustrated in FIG. 26. With this operation, there is generated the compressed file having a small file size in which the visibility of not only the black text but also the color text of one color specified by a user is maintained.

Figure 30:
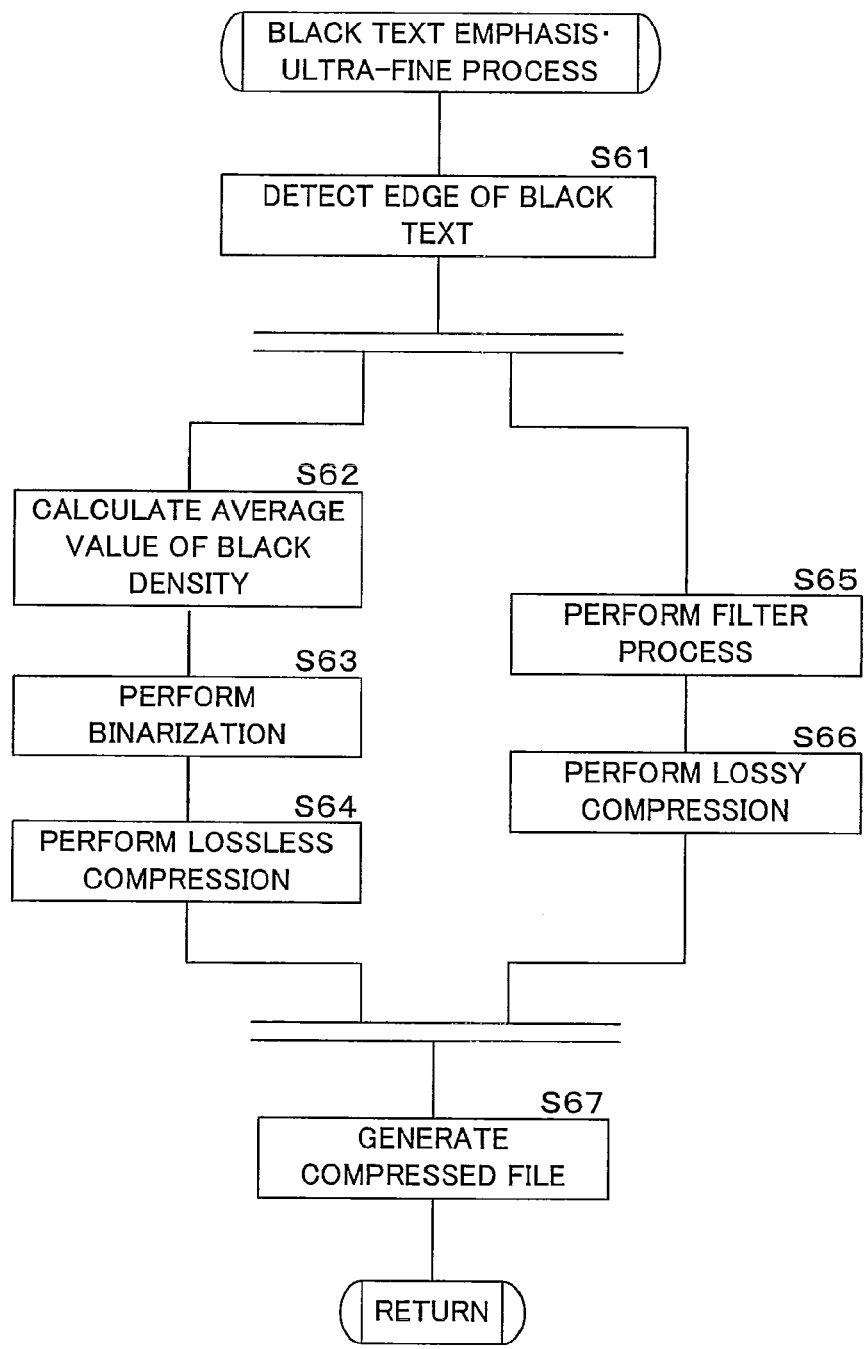
FIG. 30 is a flowchart illustrating procedures in a black text emphasis•ultra-fine process.

Next, the black text emphasis•ultra-fine process will be described. FIG. 30 is a flowchart illustrating procedures in the black text emphasis•ultra-fine process. Note that the processing section in this process is assumed to have a structure in which the compression processing section 3 illustrated in FIG. 2A or 2B is provided. When the black text emphasis•ultra-fine process is performed, the processing section detects the edge of the black text included in the image on the basis of the image data outputted from the segmentation processing section 24 using the binary data generating section 31 of the compression processing section 3 (S61). Note that the process at the time of detection of the edge of the black text is the same as the process described in Embodiment 1 so that the description thereof will be omitted.

After the detection of the edge of the black text, the processing section executes processes in steps S62 to S64, and processes in steps S65 and S66 in parallel. In the step S62, the processing section calculates the average value of black densities in pixels detected as the edge of the black text using the binary data generating section 31 (S62). In addition, the processing section performs the binarization process by the method in which density values of pixels in correspondence to the detected edge of the black text are set to 1 and density values of the other pixels are set to 0, or the like using the binary data generating section 31 (S63) to generate the foreground layer. Then, the processing section performs the lossless compression process on the generated foreground layer using the lossless compressing section 32 (S64).

On the other hand, in the step S65, the processing section performs the filter process on pixels detected as the edge of the black text (the foreground layer) such that the difference in density between the pixels and pixels in the vicinity of the edge is reduced and, at the same time, performs the density smoothing process on pixels other than pixels in correspondence to the foreground layer using the correction processing section 33 of the compression processing section 3 (S65) to generate the background layer. Subsequently, the processing section performs the lossy compression process on the image data having been subjected to the processes using the lossy compressing section 34 (S66). The processing section groups the lossless compressed foreground layer, the lossy compressed background layer, and the decompression information such as the IC table or the like together into one file to generate the compressed file (S67), and returns to the processes illustrated in FIG. 26. With this operation, there is generated the compressed file in which the visibility of the text included in the background layer is also maintained while the visibility of the black text is maintained.

Note that, when the processing section has the compression processing section 3 illustrated in FIG. 2B, the resolution reducing section 35 of the compression processing section 3 does not perform the resolution reduction process in accordance with the process signal indicative of the selection of the ultra-fine mode. With this operation, since the resolution of the background layer is not reduced, the visibility of not only the black text included in the foreground layer but also the text included in the background layer can be improved.

Figure 31:
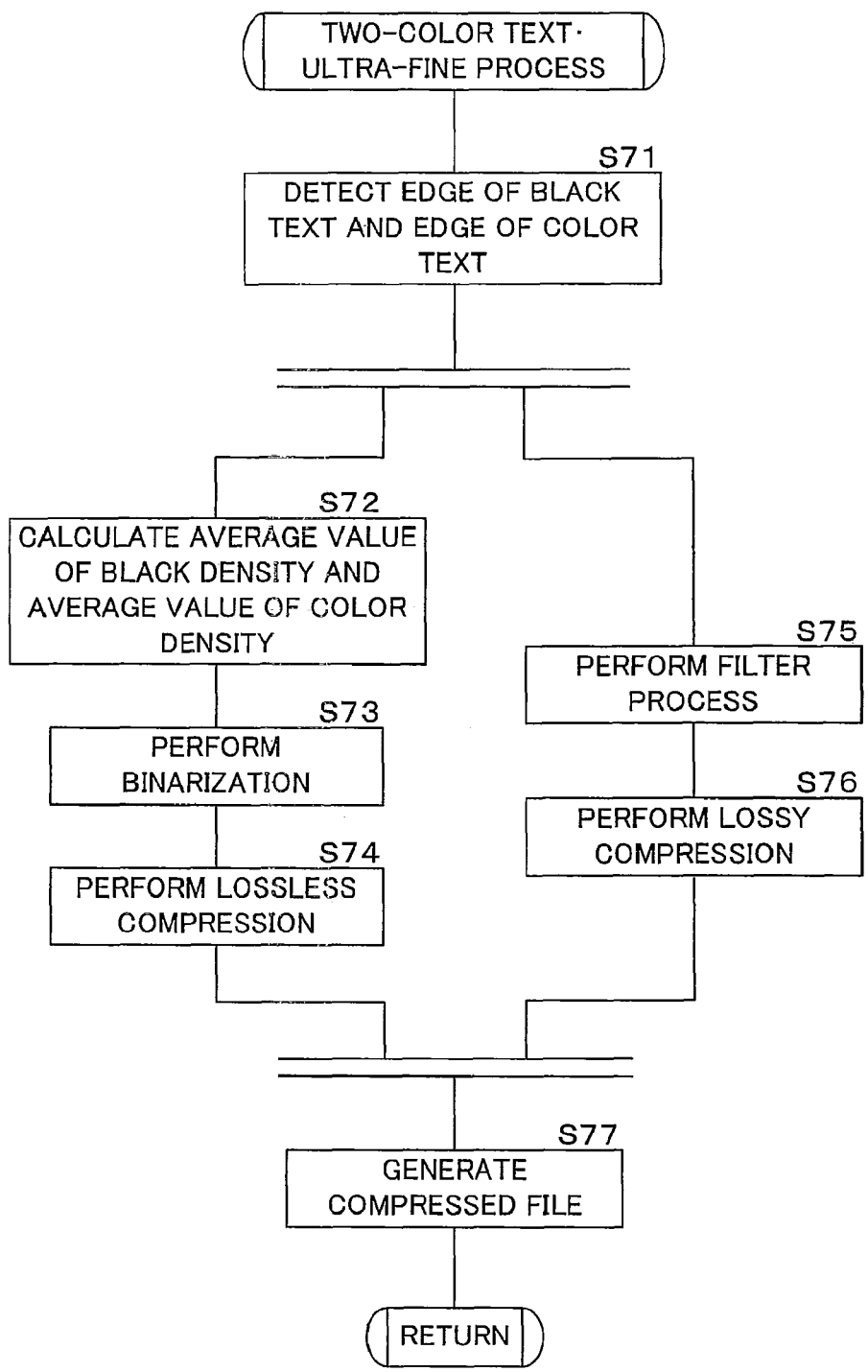
FIG. 31 is a flowchart illustrating procedures in a two-color text•ultra-fine process.

Subsequently, the two-color text•ultra-fine process will be described. FIG. 31 is a flowchart illustrating procedures in the two-color text•ultra-fine process. Note that the processing section in this process is assumed to have a structure in which the compression processing section 3 illustrated in FIG. 2A or 2B is provided. When the two-color text•ultra-fine process is performed, the processing section detects the edge of the black text and the edge of the color text of one color specified by a user that are included in the image on the basis of the image data outputted from the segmentation processing section 24 using the binary data generating section 31 of the compression processing section 3 (S71). Note that the process at the time of detection of the edges of the black text and the color text of the specific color is the same as the process described in Embodiment 1 so that the description thereof will be omitted.

After the detection of the edges of the black text and the color text of the specific color, the processing section executes processes in steps S72 to S74 and processes in steps S75 and S76 in parallel. In the step S72, the processing section calculates the average value of black densities in pixels detected as the edge of the black text and the average value of color densities in pixels detected as the edge of the color text of the specific color using the binary data generating section 31 (S72). In addition, the processing section performs the binarization process by the method in which density values of pixels in correspondence to the detected edges of the texts are set to 1 and density values of the other pixels are set to 0, or the like using the binary data generating section 31 (S73) to generate the foreground layers of the black text and the color text of the specific color. Then, the processing section performs the lossless compression process on the generated respective foreground layers using the lossless compressing section 32 (S74).

On the other hand, in the step S75, the processing section performs the filter process on pixels detected as the edge of the black text or the color text of the specific color (the foreground layer) such that the difference in density between the pixels and pixels in the vicinity of the edge is reduced and, at the same time, performs the density smoothing process on pixels other than pixels in correspondence to the foreground layer using the correction processing section 33 of the compression processing section 3 (S75) to generate the background layer. Further, the processing section performs the lossy compression process on the image data having been subjected to the processes using the lossy compressing section 34 (S76). The processing section groups the lossless compressed foreground layer, the lossy compressed background layer, and the decompression information such as the IC table or the like together into one file to generate the compressed file (S77), and returns to the processes illustrated in FIG. 26. With this operation, there is generated the compressed file in which the visibility of the text included in the background layer is also maintained while the visibility of not only the black text but also the color text of one color specified by a user is maintained.

Note that, when the processing section has the compression processing section 3 illustrated in FIG. 2B, the resolution reducing section 35 of the compression processing section 3 does not perform the resolution reduction process in accordance with the process signal indicative of the selection of the ultra-fine mode. With this operation, since the resolution of the background layer is not reduced, the visibility of not only the black text included in the foreground layer but also the text included in the background layer can be improved.

FIGS. 27 to 31 have illustrated examples of the processes performed when the process section has the compression processing section 3 illustrated in FIG. 2A or 2B. When the processing section has the compression processing section 3 illustrated in FIG. 3A or 3B, the processing section also performs the density correction process using the density correction processing sections 36 and 37 in addition to the above-described processes.

Embodiment 4

Embodiment 4 describes a configuration in which the image compressing apparatus of the present invention is realized by employing a general-purpose computer. The present invention can also be constituted as a computer program for causing a computer to execute the image processing including the image compression processes described in Embodiments 1 to 3, and the computer program can be recorded in a computer-readable recording medium. As the result, the recording medium recording a program code (an executable program, an intermediate code program, or a source program) for realizing various processes to be performed by the color image processing apparatus 2 can be provided in a portable manner.

Figure 32:
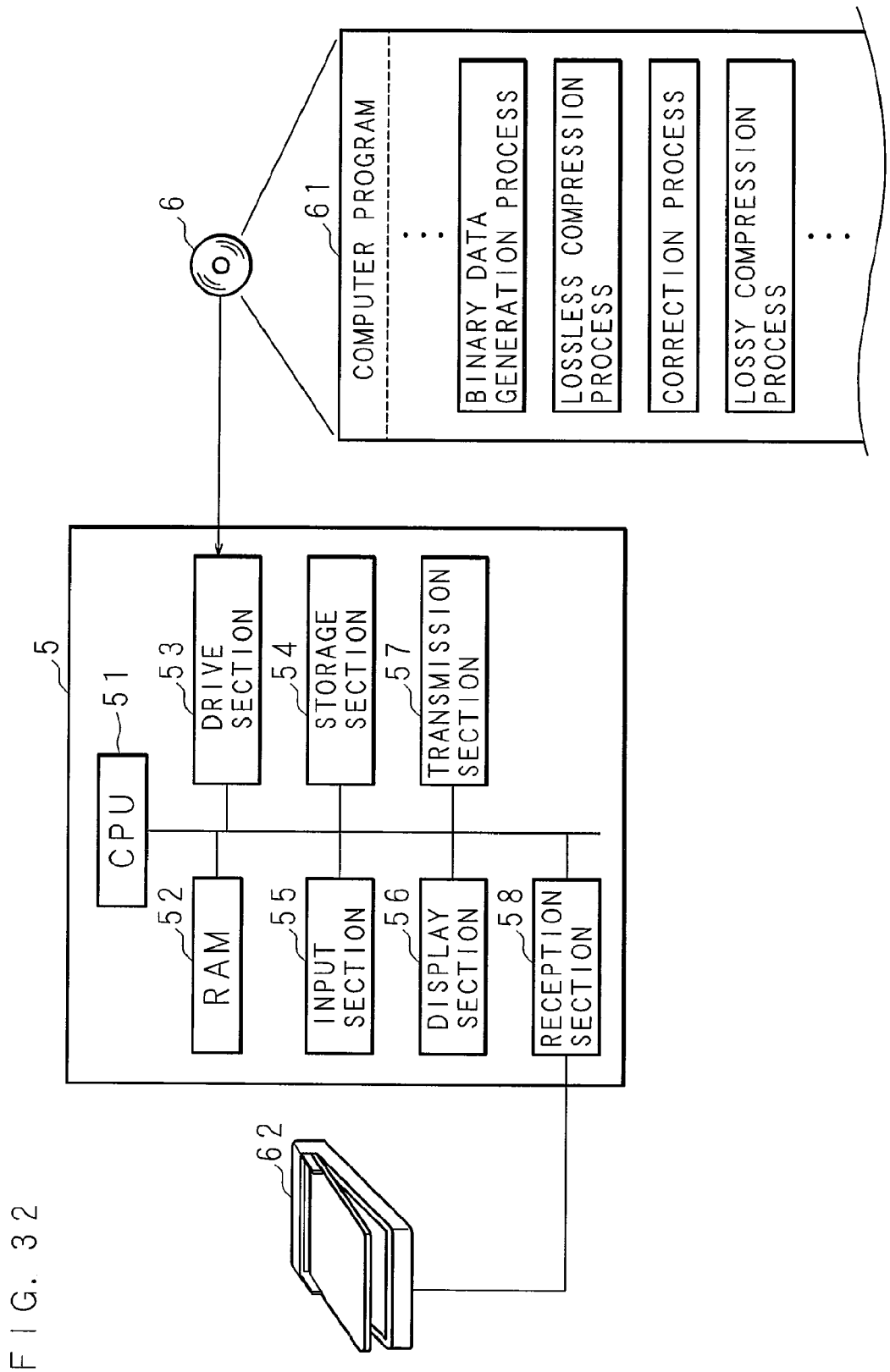
FIG. 32 is a block diagram illustrating an internal structure of an image compressing apparatus of Embodiment 4.

FIG. 32 is a block diagram illustrating the internal structure of an image compressing apparatus 5 of Embodiment 4. The image compressing apparatus 5 of Embodiment 4 is a general-purpose computer such a PC or a server apparatus, and includes a CPU 51 for performing an arithmetic operation, a RAM 52 for storing temporary information resulting from the arithmetic operation, a drive section 53 such as a CD-ROM drive or the like for reading information from a recording medium 6 of the present invention such as an optical disk or the like, and a storage section 54 such as a hard disk or the like. The CPU 51 causes the drive section 53 to read a computer program 61 of the present invention from the recording medium 6 of the present invention, and causes the storage section 54 to store the read computer program 61. The computer program 61 is loaded from the storage section 54 to the RAM 52 on an as needed basis, and the CPU 51 executes processes required for the image compressing apparatus 5 on the basis of the loaded computer program 61.

In addition, the image compressing apparatus 5 includes an input section 55 for inputting information such as various process instructions or the like by the operation of a user such as a keyboard or a pointing device, and a display section 56 for displaying various information such as a liquid crystal display or the like. Note that the input section 55 and the display section 56 correspond to the operation panel 12 described in FIG. 1. Further, the image compressing apparatus 5 includes a transmission section 57 corresponding to the transmission device 14 in FIG. 1) connectable to external communication networks (not illustrated), and a reception section 58 connected to an external input apparatus 62 (corresponding to the color image input apparatus 11 in FIG. 1) for inputting image data.

The transmission section 57 is a network card or a modem, and the input apparatus 62 is a flatbed scanner, a film scanner, or a digital camera. The input apparatus 62 optically reads an image to generate image data and transmits the generated image data to the image compressing apparatus 5, and the reception section 58 receives the image data transmitted from the input apparatus 62. In addition, the transmission section 57 is capable of transmitting data to the outside via a communication network (not illustrated) by a communication method such as facsimile or e-mail.

The CPU 51 loads the computer program 61 of the present invention to the RAM 52, and executes processes related to the image compressing method of the present invention in accordance with the loaded computer program 61. That is, when the image data is inputted to the reception section 58 from the input apparatus 62, the CPU 51 executes a binary data generation process, lossless compression process, correction process, and lossy compression process that are the same as those performed by the binary data generating section 31, the lossless compressing section 32, the correction processing section 33, and the lossy compressing section 34 in Embodiment 1. With this operation, the CPU 51 performs processing for generating a compressed file in which the received image data is compressed. The CPU 51 causes the storage section 54 to store the generated compressed file. In addition, the CPU 51 causes the transmission section 57 to perform a process for transmitting the generated compressed file or the compressed file read from the storage section 54 to the outside in accordance with the loaded computer program 61.

The recording medium 6 may also be a program medium that is an external storage device detachable from the image compressing apparatus 5, and allows reading of a program recorded therein by insertion thereof into the drive section 53 provided in the image compression apparatus 5. In addition, since the recorded program is processed by a microcomputer, the recording medium 6 may also be a program medium such as, e.g., a ROM.

In either case, the stored program may be accessed and executed by a microprocessor or, in either case, a method may also be employed in which the program code is read, the read program code is downloaded into a program storage area (not illustrated) of the microcomputer, and the program is executed. The program for the download is assumed to be pre-stored in an apparatus main body.

Herein, the program medium described above is a recording medium constituted to be separatable from the main body, and may be a medium holding the program code in a fixed manner that includes tapes such as a magnetic tape and a cassette tape, disks including magnetic disks such as a flexible disk and a hard disk, and optical disks such as CD-ROM, MO, MD, and DVD, cards such as an IC card (inclusive of a memory card) and an optical card, or semiconductor memories such as mask ROM, EPROM (Erasable Programmable Read Only Memory), EEPROM (Electrically Erasable Programmable Read Only Memory), and flash ROM.

In addition, in the present embodiment, since the system configuration is connectable to the communication network including the Internet, the program medium may also be a medium holding the program code in an unfixed manner such as downloading the program code from the communication network. When the program is downloaded from the communication network in this manner, a program for the download may be pre-stored in the apparatus main body, or may also be installed from another recording medium. Note that the present invention can be realized in the form of a computer data signal embedded in a carrier wave that is realized by electronic transmission of the program code.

As has been described above, in Embodiment 4 as well, similarly to Embodiments 1 to 3, when the image including the black text and the color text of the color specified by a user is compressed, by detecting the edges of the black text and the color text of the specific color to generate the foreground layers, and reducing the difference in density between the edges of the black text and the color text of the specific color and the other portion in the image to generate the background layer, the visibility of the black text and the color text of the specific color in the image obtained by decompressing the compressed file can be improved. Consequently, the image compressing apparatus according to Embodiment 4 is capable of generating the compressed file in which the visibility of the text is improved when the image is reproduced while reducing the size of the compressed file.

In Embodiments 1 to 4 described above, although the configuration has been described in which the process for extracting pixels in correspondence to the edge of the black text (and the color text of the specific color) as pixels included in the foreground layer is performed, the configuration is not limited thereto. The present invention may also have a configuration in which a process for extracting pixels in correspondence to a line art in which the color of pixels is black (and a color specified by a user) as pixels included in the foreground layer is performed. Further, the present invention may also have a configuration in which a process for extracting pixels in correspondence to the black text and the black line art (and the color text and the line art of the specific color) as pixels included in the foreground layer is performed.

Although the preferred embodiments of the present invention have been specifically described thus far, the individual structures and operations can be modified appropriately, and are not limited to the above-described embodiments.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image compressing apparatus having a processor that compresses an image including a plurality of pixels to generate a compressed file, comprising:
   a file format receiving section that receives selection of a file format of the compressed file;
   a compression ratio receiving section that receives selection of a compression ratio which is set with respect to the image and represents data size when compressing the image; and
   a black text selection receiving section that receives selection of whether or not a pixel constituting an edge of a black text is extracted from the image during the time of generation of the compressed file of the image,
   wherein, when the file format receiving section receives a file format that allows separation of image data into a plurality of layers and the compression ratio receiving section receives selection of high compression ratio among a plurality of compression ratios, the black text selection receiving section can receive selection of whether or not the pixel constituting the edge of the black text is extracted from the image while said processor compresses each of the layers using an appropriate method and composes the compressed image data items into one file.

2. The image compressing apparatus of claim 1, further comprising
   a process selection receiving section that receives selection of whether or not a process for improving reproducibility of a color text in the image is performed,
   wherein, when the black text selection receiving section receives selection that the pixel constituting the edge of the black text is extracted from the image, the process selection receiving section can receive from a user selection of whether or not the process for improving reproducibility of the color text is performed.

3. The image compressing apparatus of claim 1, wherein the file format includes PDF (Portable Document Format) or XPS (XML Paper Specification).

4. The image compressing apparatus of claim 1, further comprising
a color text selection receiving section that receives selection of whether or not a pixel constituting an edge of a color text of one color other than the black text is extracted from the image during the time of generation of the compressed file,
wherein, when the black text selection receiving section receives selection that the pixel constituting the edge of the black text is extracted from the image, the color text selection receiving section can receive selection of whether or not the pixel constituting the edge of the color text of one color other than the black text is extracted from the image.

5. The image compressing apparatus of claim 1, further comprising
an extracting section that extracts the pixel constituting the edge of the black text from the image when the black text selection receiving section receives the selection indicating that the pixel constituting the edge of the black text is extracted; and
a compressing section that compresses an image made of the pixel extracted by the extracting section.

6. An image outputting apparatus, comprising:
an image compressing apparatus of claim 1; and
an output section that outputs a compressed file generated in the image compressing apparatus to an outside.

7. An image compressing apparatus having a processor that compresses an image including a plurality of pixels to generate a compressed file, comprising:
a file format receiving section that receives selection of a file format of the compressed file;
a compression ratio receiving section that receives selection of a compression ratio which is set with respect to the image and represents data size when compressing the image;
a determining section by which said processor determines whether or not a number not less than a threshold value of pixels in correspondence to a black text are included in the image on a basis of a segmentation class signal indicative of which one of a plurality of segments including a text segment each pixel in the image belongs to,
when the file format receiving section receives a file format that allows separation of image data into a plurality of layers and the compression ratio receiving section receives selection of high compression ratio among a plurality of compression ratios;
an extracting section by which said processor extracts a pixel constituting an edge of the black text from the image when the determining section determines that the number not less than the threshold value of pixels in correspondence to the black text are included; and
a compressing section by which said processor compresses an image made of the pixel constituting the edge of the black text extracted by the extracting section.

8. The image compressing apparatus of claim 7, further comprising
a resolution reducing section that reduces a resolution of an image made of a pixel other than the pixel extracted from the image by the extracting section.

9. The image compressing apparatus of claim 8,
wherein the determining section determines whether or not a predetermined number or more of pixels in correspondence to a color text are included in the image on the basis of the segmentation class signal,
further comprising
a control section that prevents the resolution reducing section from performing a resolution reduction process when the determining section determines that the predetermined number or more of pixels in correspondence to the color text are included.

10. An image outputting apparatus, comprising:
an image compressing apparatus of claim 7; and
an output section that outputs a compressed file generated in the image compressing apparatus to an outside.

11. The image compressing apparatus of claim 7,
wherein the compressing section performs a lossy compression on the image when the determining section determines that the number not less than the threshold value of pixels in correspondence to the black text are not included.

12. An image compressing method for compressing an image including a plurality of pixels to generate a compressed file, comprising steps of:
receiving selection of a file format of the compressed file;
receiving selection of a compression ratio which is set with respect to the image and represents data size when compressing the image;
receiving selection of whether or not a pixel constituting an edge of a black text is extracted from the image during the time of generation of the compressed file of the image;
wherein when, in the step of receiving selection of a file format, a file format is received that allows separation of image data into a plurality of layers, compressing each of the layers using an appropriate method, and composing the compressed image data items into one file, and, in the step of receiving selection of a compression ratio, receiving selection of high compression ratio among a plurality of compression ratios, in the step of receiving selection of whether or not the pixel constituting the edge of the black text is extracted from the image, receiving selection of whether or not the pixel constituting the edge of the black text is extracted from the image; and
compressing an image made of the extracted pixel.

13. An image compressing method for compressing an image including a plurality of pixels to generate a compressed file, comprising steps of:
receiving selection of a file format of the compressed file;
receiving selection of a compression ratio which is set with respect to the image and represents data size when compressing the image;
determining whether or not a predetermined number or more of pixels in correspondence to a black text are included in the image on a basis of a segmentation class signal indicative of which one of a plurality of segments including a text segment each pixel in the image belongs to when a high compression ratio among a plurality of compression ratios is received;
extracting a pixel constituting an edge of the black text from the image when it is determined that the predetermined number or more of pixels in correspondence to the black text are included; and compressing an image made of the extracted pixel.

14. A non-transitory computer-readable recording medium in which a computer program for causing a computer to compress an image including a plurality of pixels to generate a compressed file is recorded, the computer program comprising steps of:

causing the computer to receive selection of a file format of the compressed file, and to extract a pixel constituting an edge of a black text from the image when selection of a specific compression ratio, as a compression ratio which is set with respect to the image and represents data size when compressing the image, is received, and selection indicating that the pixel constituting the edge of the black text is extracted from the image during the time of generation of the compressed file of the image is received, wherein, the file format allowing separation of image data into a plurality of layers, compressing each of the layers using an appropriate method, and composing the compressed image data items into one file and the specific compression ratio being a high compression ratio among a plurality of compression ratios, and causing the computer to compress an image made of the extracted pixel.

15. A non-transitory computer-readable recording medium in which a computer program for causing a computer to compress an image including a plurality of pixels to generate a compressed file is recorded, the computer program comprising steps of:

causing the computer to receive selection of a file format of the compressed file, and to determine whether or not a predetermined number or more of pixels in correspondence to a black text are included in the image on a basis of a segmentation class signal indicative of which one of a plurality of segments including a text segment each pixel in the image belongs to when selection of a specific compression ratio, as a compression ratio which is set with respect to the image and represents data size when compressing the image, is received;

causing the computer to extract a pixel constituting an edge of the black text from the image when the computer determines that the predetermined number or more of pixels in correspondence to the black text are included; and causing the computer to compress an image made of the extracted pixel.

* * * * *